(12) United States Patent
Kobayashi

(10) Patent No.: US 8,131,657 B2
(45) Date of Patent: Mar. 6, 2012

(54) INFORMATION PROCESSING DEVICE, INFORMATION PROCESSING METHOD, AND PROGRAM

(75) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 734 days.

(21) Appl. No.: 12/243,690

(22) Filed: Oct. 1, 2008

(65) Prior Publication Data

US 2009/0106177 A1    Apr. 23, 2009

(30) Foreign Application Priority Data

Oct. 22, 2007  (JP) ............... P2007-273416
Oct. 22, 2007  (JP) ............... P2007-273417
Oct. 22, 2007  (JP) ............... P2007-273418

(51) Int. Cl.
*G06F 15/18*    (2006.01)
*G06N 3/00*     (2006.01)
*G06N 3/12*     (2006.01)

(52) U.S. Cl. .......................................... 706/13
(58) Field of Classification Search .......... 706/13
See application file for complete search history.

(56) References Cited

U.S. PATENT DOCUMENTS 7,624,012 B2 * 11/2009 Pachet et al. ............. 704/249
2004/0181401 A1 * 9/2004 Pachet et al. ............. 704/223

FOREIGN PATENT DOCUMENTS

| JP | 2000-020504 | 1/2000 |
| JP | 2004-355174 | 12/2004 |
| JP | 2007-49641 | 2/2007 |
| JP | 2007-121457 | 5/2007 |
| WO | WO 2007/049641 A1 | 5/2007 |

OTHER PUBLICATIONS

Search Report in EP 08 25 3015 (May 6, 2010).
"Notice from the European Patent Office Dated Oct. 1, 2007 Concerning Business Methods," Official Journal of the European Patent Office, vol. 30, No. 11, pp. 592-593 (Nov. 2007).

* cited by examiner

*Primary Examiner* — Michael B Holmes
(74) *Attorney, Agent, or Firm* — Finnegan, Henderson, Farabow, Garret & Dunner, L.L.P.

(57) ABSTRACT

An information processing device for generating a target feature amount computational expression for outputting a target feature amount corresponding to input data, comprising: a feature amount extraction expression list generating unit configured to generate and update a feature amount extraction expression list; a feature amount computing unit configured to input actual data supplied as tutor data to each feature amount extraction expression included in the feature amount extraction expression list to compute multiple feature amounts corresponding to the actual data; a target feature amount computational expression generating unit configured to employ the multiple feature amounts, and an existing feature amount corresponding to the actual data supplied as tutor data for the same rank to generate the target feature amount computational expression by machine learning; and an evaluation value computing unit configured to compute the evaluation value of each feature amount extraction expression included in the feature amount extraction expression list.

19 Claims, 13 Drawing Sheets

FIG. 2

| TUTOR DATA T₁ | ACTUAL DATA D₁ | EXISTING FEATURE AMOUNT F1₁ | ... | EXISTING FEATURE AMOUNT Fn₁ | TARGET FEATURE AMOUNT I1₁ | ... | TARGET FEATURE AMOUNT Ik₁ |
|---|---|---|---|---|---|---|---|
| TUTOR DATA T₂ | ACTUAL DATA D₂ | EXISTING FEATURE AMOUNT F1₂ | ... | EXISTING FEATURE AMOUNT Fn₂ | TARGET FEATURE AMOUNT I1₂ | ... | TARGET FEATURE AMOUNT Ik₂ |
| ... | ... | ... | | ... | ... | | ... |
| TUTOR DATA T_L | ACTUAL DATA D_L | EXISTING FEATURE AMOUNT F1_L | ... | EXISTING FEATURE AMOUNT Fn_L | TARGET FEATURE AMOUNT I1_L | ... | TARGET FEATURE AMOUNT Ik_L |

FIG. 4B  Spectrum, F#Differential, F#MaxIndex, T#LPF_1;0.861, T#UVariance

FIG. 4C  Pict, C#Monochrome, X;Y#Median2D;3, X#FFT, Y#FFT, X;Y#XDefference;0.2;0.2

FIG. 4D  WavM, 16#DownSampling_To;27.999268, 16#NormalizeEach, 16#Skewness

FIG. 6

FEATURE AMOUNT EXTRACTION EXPRESSION LIST

| FEATURE AMOUNT EXTRACTION EXPRESSION f1 | WavM,16#DownSampling_To;27.999268, 16#NormalizeEach, 16#Skewness<br>WavM,16#DownSampling_To;62.265602, 16#DownSampling_To;57.964432, 16#StdDev<br>WavM,16#HPF_1;0.215608, 16#LogAxisOctH;9.528571, 16#Order, 16#Entropy<br>WavM,16#Histogram;33.312595, 16#StdDev<br>WavM,16#Histogram;39.602398, 16#Skewness |

. . .

| FEATURE AMOUNT EXTRACTION EXPRESSION fm | WavM, Abs, 16#DownSampling_To;43.249527, 16#Extract1;0.254782<br>WavM, NormalizeAvg, 16#Max<br>WavM, Sign, 16#MaxIndex |

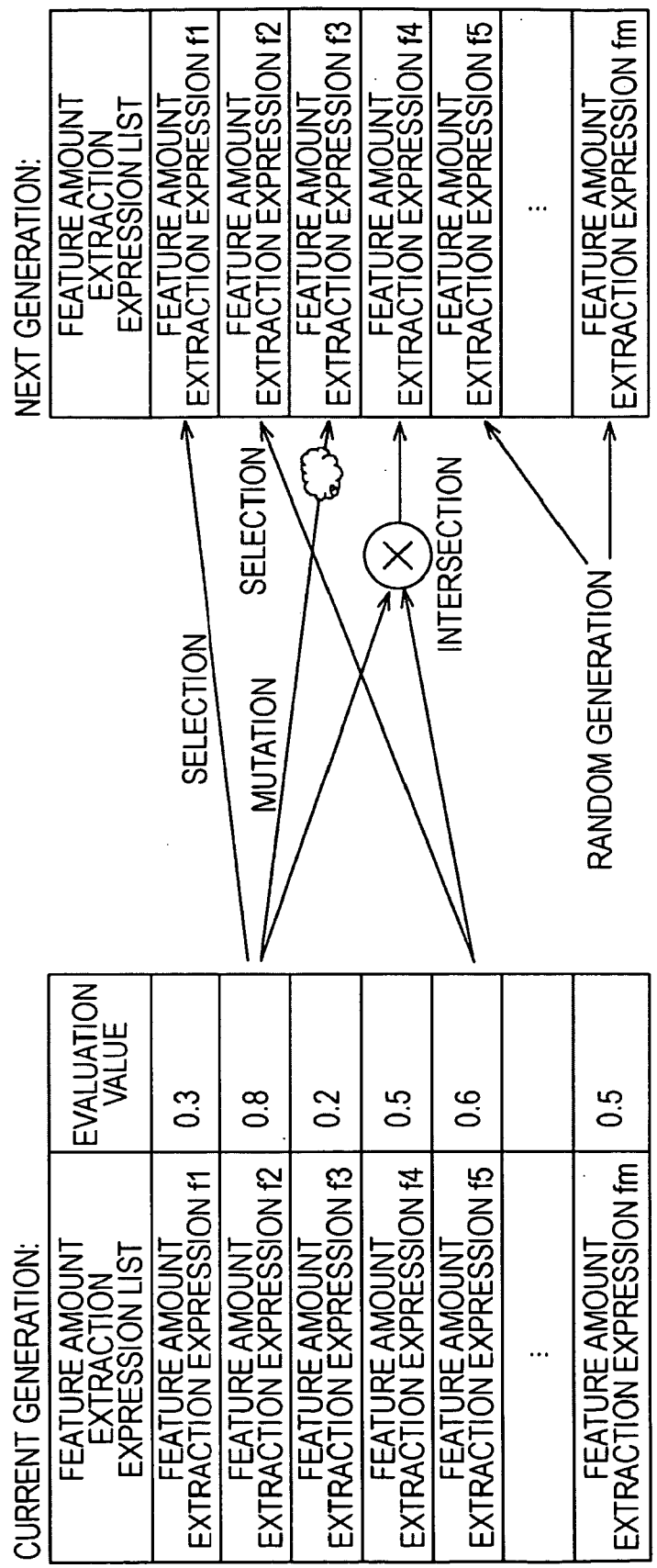

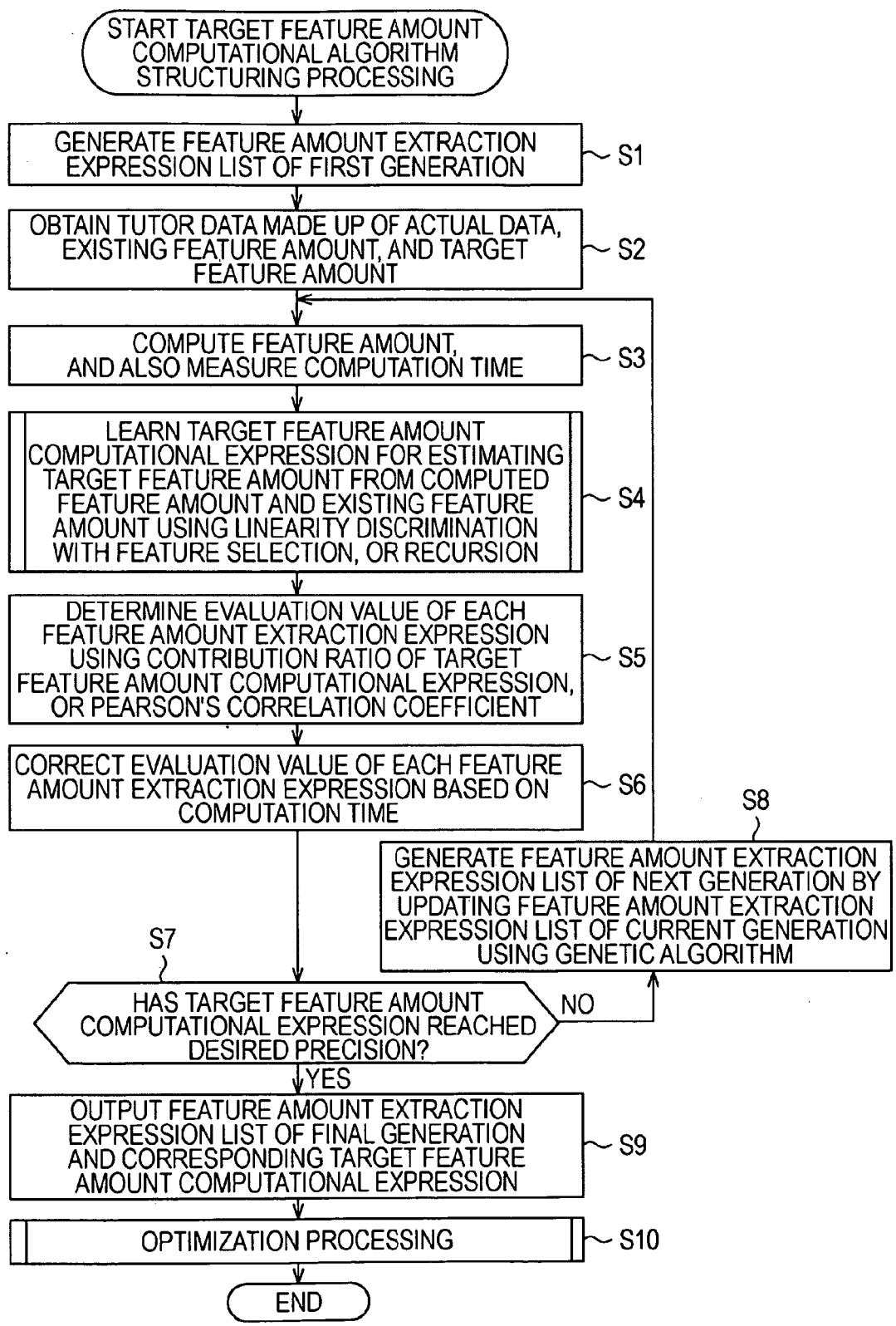

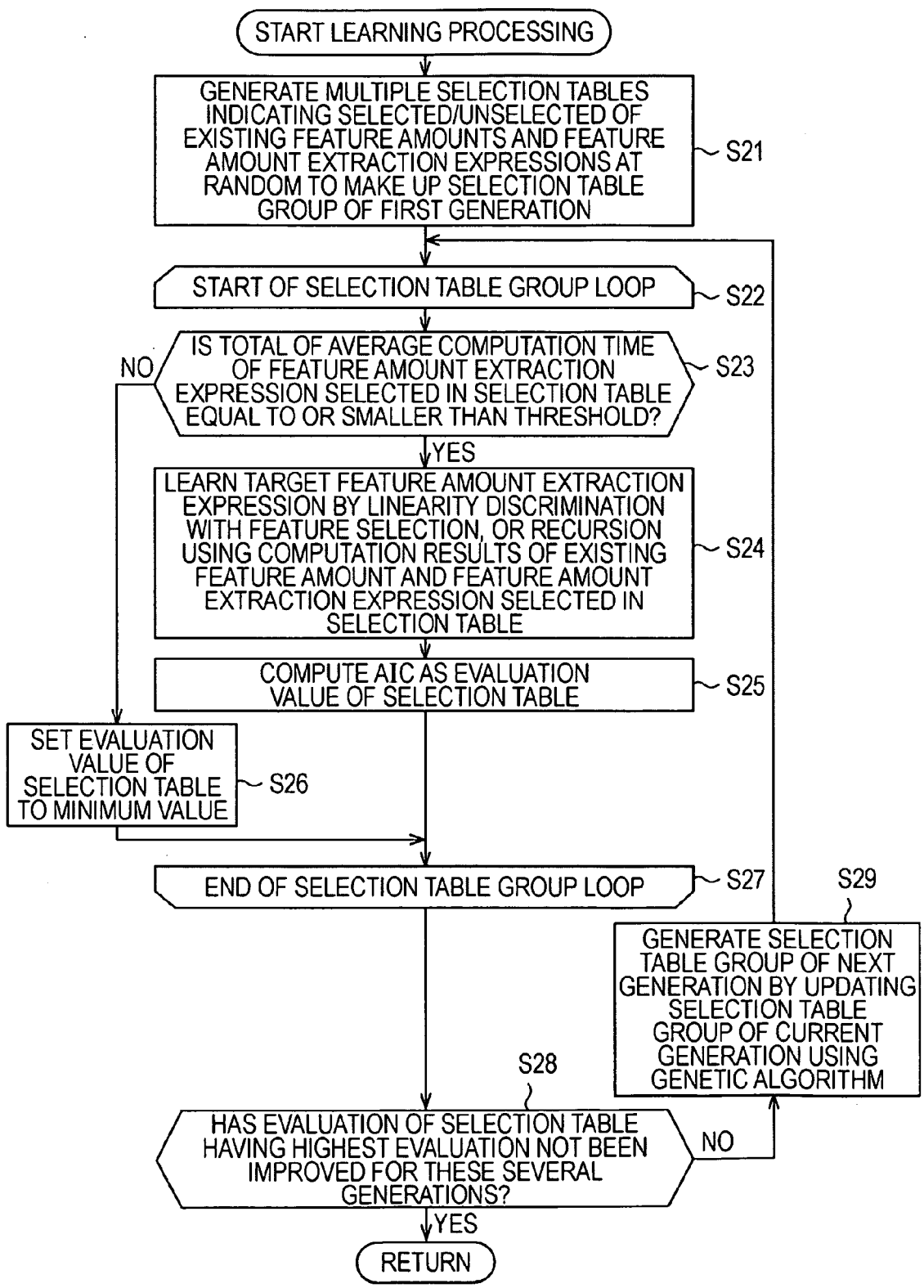

FIG. 10

| | SELECTION TABLE TB1 | SELECTION TABLE TB2 | SELECTION TABLE TB3 | ... | SELECTION TABLE TBx |
|---|---|---|---|---|---|
| EXISTING FEATURE AMOUNT f1 | O | × | O | ... | O |
| ... | ... | ... | ... | | ... |
| EXISTING FEATURE AMOUNT fn | O | O | O | ... | × |
| FEATURE AMOUNT EXTRACTION EXPRESSION f1 | O | O | × | ... | O |
| FEATURE AMOUNT EXTRACTION EXPRESSION f2 | O | O | O | ... | O |
| ... | ... | ... | ... | | ... |
| FEATURE AMOUNT EXTRACTION EXPRESSION fm | O | O | O | ... | × |

INFORMATION PROCESSING DEVICE, INFORMATION PROCESSING METHOD, AND PROGRAM

CROSS REFERENCES TO RELATED APPLICATIONS

The present invention contains subject matter related to Japanese Patent Application JP 2007-273417, Japanese Patent Application JP 2007-273416, and Japanese Patent Application JP 2007-2734178, all filed in the Japanese Patent Office on Oct. 22, 2007, the entire contents of which are incorporated herein by reference.

BACKGROUND OF THE INVENTION

1. Field of the Invention

The present invention relates to an information processing device, information processing method, and program, and particularly, relates to an information processing device, information processing method, and program, which enable a feature amount computational algorithm to be structured automatically, whereby the feature amount of content data, for example, such as music data can be computed.

2. Description of the Related Art

Heretofore, there have been proposed a method employing a genetic search method (e.g., International Publication No. WO2007/049641) and a method not employing a genetic search method (e.g., U.S. Patent Application Publication US 2004/0181401A1) as an invention for automatically structuring a feature amount computational algorithm whereby the feature amount (speed, brightness, liveliness, or the like in a case wherein input data is music data) of input data, such as music data, image data, or the like, can be output.

SUMMARY OF THE INVENTION

However, a feature amount computational algorithm structured automatically by the related art frequently includes redundant arithmetic operations as compared to a feature amount computational algorithm structured manually, and consequently, time necessary for an arithmetic operation for obtaining a feature amount corresponding to input data is prolonged in some cases.

Also, of existing feature amounts which can be obtained without performing computation using a feature amount computational algorithm to be developed, something considerable as effective for structuring a feature amount computational algorithm has been known among feature amount computational algorithm developers, but a method employed for structuring of a feature amount computational algorithm has not been proposed so far.

Note that, hereafter, with the present Specification, an existing feature amount which can be obtained without performing computation using a feature amount computational algorithm to be structured automatically will be referred to as an existing feature amount. On the other hand, a feature amount to be obtained by using a feature amount computational algorithm will be referred to as a target feature amount.

There has been recognized demand for automatically structuring a feature amount computational algorithm, whereby a target feature amount corresponding to input data can be computed by employing an existing feature amount corresponding to input data as well.

An information processing device according to an embodiment of the present invention, which is an embodiment of the present invention, for taking input data and an existing feature amount corresponding to the input data as input, and generating a target feature amount computational expression for outputting a target feature amount corresponding to the input data, includes: a feature amount extraction expression list generating unit configured to generate a feature amount extraction expression list including a plurality of feature amount extraction expressions made up of a plurality of operators by updating the feature amount extraction expression list of the previous generation using a genetic algorithm based on the evaluation values of the feature amount extraction expressions, regarding a plurality of feature amount extraction expressions included in the feature amount extraction expression list of the previous generation as genes; a feature amount computing unit configured to input actual data supplied as tutor data to each feature amount extraction expression included in the feature amount extraction expression list to compute a plurality of feature amounts corresponding to the actual data; a target feature amount computational expression generating unit configured to employ the plurality of feature amounts corresponding to the computed actual data, and an existing feature amount corresponding to the actual data supplied as tutor data for the same rank to generate the target feature amount computational expression by machine learning for estimating a target feature amount corresponding to the actual data supplied as tutor data; and an evaluation value computing unit configured to compute the evaluation value of each feature amount extraction expression included in the feature amount extraction expression list.

The target feature amount computational expression generating unit may selectively employ some of the plurality of feature amounts corresponding to the computed actual data, and some of a plurality of existing feature amount corresponding to the actual data supplied as tutor data for the same rank to generate the target feature amount computational expression by machine learning for estimating the target feature amount corresponding to the actual data supplied as tutor data.

The evaluation value computing unit may compute the evaluation value of each feature amount extraction expression included in the feature amount extraction expression list based on a contribution ratio of the target feature amount computational expression of the plurality of feature amounts corresponding to the computed actual data.

An information processing device according to an embodiment of the present invention, for generating a target feature amount computational expression for outputting a target feature amount corresponding to input data, includes: a feature amount extraction expression list generating unit configured to generate a feature amount extraction expression list including a plurality of feature amount extraction expressions made up of a plurality of operators by updating the feature amount extraction expression list of the previous generation using a genetic algorithm based on the evaluation values of the feature amount extraction expressions, regarding a plurality of feature amount extraction expressions included in the feature amount extraction expression list of the previous generation as genes; a feature amount computing unit configured to input actual data supplied as tutor data to each feature amount extraction expression included in the feature amount extraction expression list to compute a plurality of feature amounts corresponding to the actual data, and also measure average computation time of the respective feature amount extraction expressions; a target feature amount computational expression generating unit configured to employ the plurality of feature amounts corresponding to the computed actual data to generate the target feature amount computational expression by machine learning for estimating a target feature amount corresponding to the actual data supplied as tutor data; and an evaluation value computing unit configured to compute the evaluation value of each feature amount extraction expression included in the feature amount extraction expression list, and also correct the computed evaluation value based on the average computation time of the respective feature amount extraction expressions.

The target feature amount computational expression generating unit may selectively employ some of the plurality of feature amounts corresponding to the computed actual data to generate the target feature amount computational expression by machine learning for estimating the target feature amount corresponding to the actual data supplied as tutor data.

The target feature amount computational expression generating unit may selectively employ some of the plurality of feature amounts corresponding to the computed actual data based on the average computation time of the corresponding feature amount extraction expression to generate the target feature amount computational expression by machine learning for estimating the target feature amount corresponding to the actual data supplied as tutor data.

An information processing device according to an embodiment of the present invention for generating a target feature amount computational expression for outputting a target feature amount corresponding to input data, includes: a feature amount extraction expression list generating unit configured to generate a feature amount extraction expression list including a plurality of feature amount extraction expressions made up of a plurality of operators by updating the feature amount extraction expression list of the previous generation using a genetic algorithm based on the evaluation values of the feature amount extraction expressions, regarding a plurality of feature amount extraction expressions included in the feature amount extraction expression list of the previous generation as genes; a feature amount computing unit configured to input actual data supplied as tutor data to each feature amount extraction expression included in the feature amount extraction expression list to compute a plurality of feature amounts corresponding to the actual data; a target feature amount computational expression generating unit configured to employ the plurality of feature amounts corresponding to the computed actual data to generate the target feature amount computational expression by machine learning for estimating a target feature amount corresponding to the actual data supplied as tutor data; an evaluation value computing unit configured to compute the evaluation value of each feature amount extraction expression included in the feature amount extraction expression list; and an optimizing unit configured to optimize each of plurality of feature amount extraction expressions included in the feature amount extraction expression list of the final generation.

The optimizing unit may include a feature amount extraction expression optimizing unit configured to optimize each feature amount extraction expression included in the feature amount extraction expression list of the final generation by detecting an optimization pattern indicating a combination of redundant operators registered beforehand from the respective feature amount extraction expressions included in the feature amount extraction expression list of the final generation, and deleting an operator or replacing with an operator of which the arithmetic load is smaller.

The optimizing unit may include a feature amount extraction expression optimizing unit configured to deform each feature amount extraction expression included in the feature amount extraction expression list of the final generation to generate a plurality of optimizing candidate expressions, give an excellent evaluation to one of the plurality of generated optimizing candidate expressions of which the output having a high degree of correlation with the output of the feature amount extraction expression which is a deformation source is obtained, and of which the computation time is shorter, regard the plurality of generated optimizing candidate expressions as genes, employ a genetic algorithm based on the evaluation of the optimizing candidate expressions to update the plurality of generated optimizing candidate expressions, and ultimately determines the optimizing candidate expression having the most excellent evaluation as the optimization result of the respective feature amount extraction expressions included in the feature amount extraction expression list of the final generation.

The optimizing unit may include a restructuring unit configured to employ the optimized feature amount extraction expression to restructure the target feature amount computational expression generated corresponding to the feature amount extraction expression list of the final generation.

An information processing method according to an embodiment of the present invention, for taking input data and an existing feature amount corresponding to the input data as input, and generating a target feature amount computational expression for outputting a target feature amount corresponding to the input data, includes the steps of: generating a feature amount extraction expression list including a plurality of feature amount extraction expressions made up of a plurality of operators at random; inputting actual data supplied as tutor data to each feature amount extraction expression included in the feature amount extraction expression list to compute a plurality of feature amounts corresponding to the actual data; employing the plurality of feature amounts corresponding to the computed actual data, and an existing feature amount corresponding to the actual data supplied as tutor data for the same rank to generate the target feature amount computational expression by machine learning for estimating a target feature amount corresponding to the actual data supplied as tutor data; computing the evaluation value of each feature amount extraction expression included in the feature amount extraction expression list; and generating the feature amount extraction expression list of the next generation by updating the feature amount extraction expression list of the previous generation using a genetic algorithm based on the evaluation values of the feature amount extraction expressions, regarding a plurality of feature amount extraction expressions included in the feature amount extraction expression list of the previous generation as genes.

An information processing method according to an embodiment of the present invention, for generating a target feature amount computational expression for outputting a target feature amount corresponding to input data, includes the steps of: generating a feature amount extraction expression list including a plurality of feature amount extraction expressions made up of a plurality of operators at random; inputting actual data supplied as tutor data to each feature amount extraction expression included in the feature amount extraction expression list to compute a plurality of feature amounts corresponding to the actual data, and also measure the average computation time of the respective feature amount extraction expressions; employing the plurality of feature amounts corresponding to the computed actual data to generate the target feature amount computational expression by machine learning for estimating a target feature amount corresponding to the actual data supplied as tutor data; computing the evaluation value of each feature amount extraction expression included in the feature amount extraction expression list, and also correcting the computed evaluation value based on the average computation time of the respective feature amount extraction expressions; and generating the feature amount extraction expression list of the next generation by updating the feature amount extraction expression list of the previous generation using a genetic algorithm based on the evaluation values of the feature amount extraction expressions, regarding a plurality of feature amount extraction expressions included in the feature amount extraction expression list of the previous generation as genes.

An information processing method according to an embodiment of the present invention, for generating a target feature amount computational expression for outputting a target feature amount corresponding to input data, includes the steps of: generating a feature amount extraction expression list including a plurality of feature amount extraction expressions made up of a plurality of operators at random; inputting actual data supplied as tutor data to each feature amount extraction expression included in the feature amount extraction expression list to compute a plurality of feature amounts corresponding to the actual data; employing the plurality of feature amounts corresponding to the computed actual data to generate the target feature amount computational expression by machine learning for estimating a target feature amount corresponding to the actual data supplied as tutor data; computing the evaluation value of each feature amount extraction expression included in the feature amount extraction expression list; generating the feature amount extraction expression list of the next generation by updating the feature amount extraction expression list of the previous generation using a genetic algorithm based on the evaluation values of the feature amount extraction expressions, regarding a plurality of feature amount extraction expressions included in the feature amount extraction expression list of the previous generation as genes; and optimizing each of plurality of feature amount extraction expressions included in the feature amount extraction expression list of the final generation.

A program according to an embodiment of the present invention, for controlling an information processing device for taking input data and an existing feature amount corresponding to the input data as input, and generating a target feature amount computational expression for outputting a target feature amount corresponding to the input data, and causing a computer of the information processing device to execute processing includes the steps of: generating a feature amount extraction expression list including a plurality of feature amount extraction expressions made up of a plurality of operators at random; inputting actual data supplied as tutor data to each feature amount extraction expression included in the feature amount extraction expression list to compute a plurality of feature amounts corresponding to the actual data; employing the plurality of feature amounts corresponding to the computed actual data, and an existing feature amount corresponding to the actual data supplied as tutor data for the same rank to generate the target feature amount computational expression by machine learning for estimating a target feature amount corresponding to the actual data supplied as tutor data; computing the evaluation value of each feature amount extraction expression included in the feature amount extraction expression list; and generating the feature amount extraction expression list of the next generation by updating the feature amount extraction expression list of the previous generation using a genetic algorithm based on the evaluation values of the feature amount extraction expressions, regarding a plurality of feature amount extraction expressions included in the feature amount extraction expression list of the previous generation as genes.

A program according to an embodiment of the present invention, for controlling an information processing device for outputting a target feature amount corresponding to input data, and causing a computer of the information processing device to execute processing includes the steps of: generating a feature amount extraction expression list including a plurality of feature amount extraction expressions made up of a plurality of operators at random; inputting actual data supplied as tutor data to each feature amount extraction expression included in the feature amount extraction expression list to compute a plurality of feature amounts corresponding to the actual data, and also measure the average computation time of the respective feature amount extraction expressions; employing the plurality of feature amounts corresponding to the computed actual data to generate the target feature amount computational expression by machine learning for estimating a target feature amount corresponding to the actual data supplied as tutor data; computing the evaluation value of each feature amount extraction expression included in the feature amount extraction expression list, and also correcting the computed evaluation value based on the average computation time of the respective feature amount extraction expressions; and generating the feature amount extraction expression list of the next generation by updating the feature amount extraction expression list of the previous generation using a genetic algorithm based on the evaluation values of the feature amount extraction expressions, regarding a plurality of feature amount extraction expressions included in the feature amount extraction expression list of the previous generation as genes.

A program according to an embodiment of the present invention, for controlling an information processing device for outputting a target feature amount corresponding to input data, and causing a computer of the information processing device to execute processing includes the steps of: generating a feature amount extraction expression list including a plurality of feature amount extraction expressions made up of a plurality of operators at random; inputting actual data supplied as tutor data to each feature amount extraction expression included in the feature amount extraction expression list to compute a plurality of feature amounts corresponding to the actual data; employing the plurality of feature amounts corresponding to the computed actual data to generate the target feature amount computational expression by machine learning for estimating a target feature amount corresponding to the actual data supplied as tutor data; computing the evaluation value of each feature amount extraction expression included in the feature amount extraction expression list; generating the feature amount extraction expression list of the next generation by updating the feature amount extraction expression list of the previous generation using a genetic algorithm based on the evaluation values of the feature amount extraction expressions, regarding a plurality of feature amount extraction expressions included in the feature amount extraction expression list of the previous generation as genes; and optimizing each of plurality of feature amount extraction expressions included in the feature amount extraction expression list of the final generation.

With an embodiment of the present invention, a feature amount extraction expression list including multiple feature amount extraction expressions made up of multiple operators is generated, actual data supplied as tutor data is input to the respective feature amount extraction expressions included in the feature amount extraction expression list to compute multiple feature amounts corresponding to the actual data. Also, a target feature amount computational expression is generated by machine learning wherein the multiple feature amounts corresponding to the computed actual data, and an existing feature amount corresponding to the actual data supplied as tutor data are employed for the same rank to estimate a target feature amount corresponding to the actual data supplied as tutor data. Further, the evaluation values of the respective feature amount extraction expressions included in the feature amount extraction expression list are computed, and the feature amount extraction expression list of the next generation is generated by updating the feature amount extraction expression list of the previous generation using a genetic algorithm based on the evaluation values of the feature amount extraction expressions, regarding the multiple feature amount extraction expressions included in the feature amount extraction expression list of the previous generation as genes.

With an embodiment of the present invention, a feature amount extraction expression list including multiple feature amount extraction expressions made up of multiple operators is generated, actual data supplied as tutor data is input to the respective feature amount extraction expressions included in the feature amount extraction expression list to compute multiple feature amounts corresponding to the actual data, and also the average computation time of the respective feature amount extraction expressions is measured. Also, a target feature amount computational expression is generated by machine learning wherein the multiple feature amounts corresponding to the computed actual data are employed to estimate a target feature amount corresponding to the actual data supplied as tutor data, the evaluation values of the respective feature amount extraction expressions included in the feature amount extraction expression list are computed, and also the computed evaluation values are corrected based on the average computation time of the respective feature amount extraction expressions. Further, the feature amount extraction expression list of the next generation is generated by updating the feature amount extraction expression list of the previous generation using a genetic algorithm based on the evaluation values of the feature amount extraction expressions, regarding the multiple feature amount extraction expressions included in the feature amount extraction expression list of the previous generation as genes.

With an embodiment of the present invention, a feature amount extraction expression list including multiple feature amount extraction expressions made up of multiple operators is generated, actual data supplied as tutor data is input to the respective feature amount extraction expressions included in the feature amount extraction expression list to compute multiple feature amounts corresponding to the actual data. Also, a target feature amount computational expression is generated by machine learning wherein the multiple feature amounts corresponding to the computed actual data are employed to estimate a target feature amount corresponding to the actual data supplied as tutor data, and the evaluation values of the respective feature amount extraction expressions included in the feature amount extraction expression list are computed. Subsequently, the feature amount extraction expression list of the next generation is generated by updating the feature amount extraction expression list of the previous generation using a genetic algorithm based on the evaluation values of the feature amount extraction expressions, regarding the multiple feature amount extraction expressions included in the feature amount extraction expression list of the previous generation as genes. Further, the multiple respective feature amount extraction expressions included in the feature amount extraction expression list of the final generation are optimized.

According to an embodiment of the present invention, a feature amount computational algorithm can be automatically structured, whereby a target feature amount corresponding to input data can be computed even employing an existing feature amount of input data.

According to an embodiment of the present invention, a feature amount computational algorithm can be automatically structured, whereby a target feature amount corresponding to input data can be computed by putting limitations on computation time.

According to an embodiment of the present invention, a feature amount computational algorithm can be automatically structured, whereby a target feature amount corresponding to input data can be computed without redundancy.

BRIEF DESCRIPTION OF THE DRAWINGS

FIG. 2 is a diagram illustrating the data structure of tutor data;

FIG. 6 is a diagram illustrating an example of a feature amount extraction expression list;

FIG. 7 is a diagram for describing a genetic algorithm;

FIG. 8 is a flowchart for describing the operation of a target feature amount computational expression structuring system to which an embodiment of the present invention has been applied;

FIG. 9 is a flowchart for describing step S4 shown in FIG. 8 in detail;

FIG. 10 is a diagram illustrating an example of a selection table group;

DESCRIPTION OF THE PREFERRED EMBODIMENTS

Description will be made below in detail regarding a specific embodiment to which the present invention has been applied with reference to the drawings.

Figure 1:
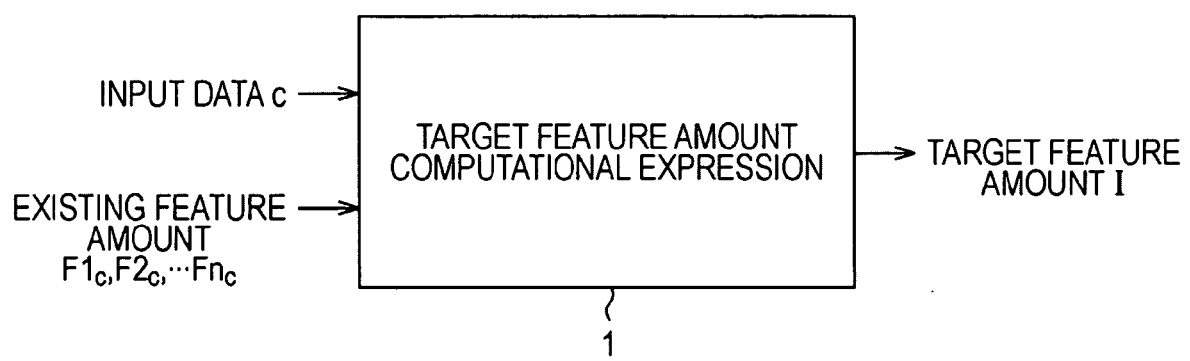
FIG. 1 is a diagram for describing a target feature amount computational expression generated by a target feature amount computational expression structuring system to which an embodiment of the present invention has been applied.

A target feature amount computational expression structuring system 10 (FIG. 3) to which an embodiment of the present invention has been applied generates a target feature amount computational expression 1 by machine learning employing a plurality of tutor data to be supplied, wherein input data C and multiple existing feature amounts $F1_c$, $F2_c$, and so on through $Fn_c$ corresponding thereto are taken as input, such as shown in FIG. 1, and each of multiple feature amounts I corresponding to the relevant input data is output.

FIG. 2 shows the data structure of tutor data. That is to say, tutor data $T_i$ (i=1, 2, and so on through L) is made up of actual data $D_i$ which is the same kind of data as the input data C, multiple existing feature amounts $F1_i$ through $Fn_i$ corresponding to the actual data $D_i$, and multiple target feature amounts $I1_i$ through $Ik_i$ corresponding to the actual data $D_i$.

The existing feature amounts $F1_i$ through $Fn_i$ are values indicating the features of the actual data $D_i$ to be detected from the actual data $D_i$ using an existing method. The target feature amounts $I1i$ through $Ik_i$ are values indicating the features of the actual data $D_i$ not to be detected from the actual data $D_i$ using an existing method, e.g., values determined by digitizing impressions obtained by having multiple persons monitor the actual data $D_i$.

As shown in FIG. 2, in a case wherein there are k types of target feature amounts, k target feature amount computational expressions are generated by the target feature amount computational expression structuring system 10.

Note that the type of the input data C is arbitrary as long as the input data C is multidimensional data. For example, music data having a time dimension and channel dimension, image data having an X dimension, Y dimension, and pixel dimension, moving image data obtained by adding a time dimension to image data, or the like can be employed as the input data C.

Note that with the following description, an example will be described wherein music data is employed as the input data C. Examples of multiple existing feature amounts corresponding to music data include tempo, speed, and fluctuation of tempo. Also, examples of target feature amounts corresponding to music data include the brightness, and speed of music data, and numerousness of musical instruments.

Figure 3:
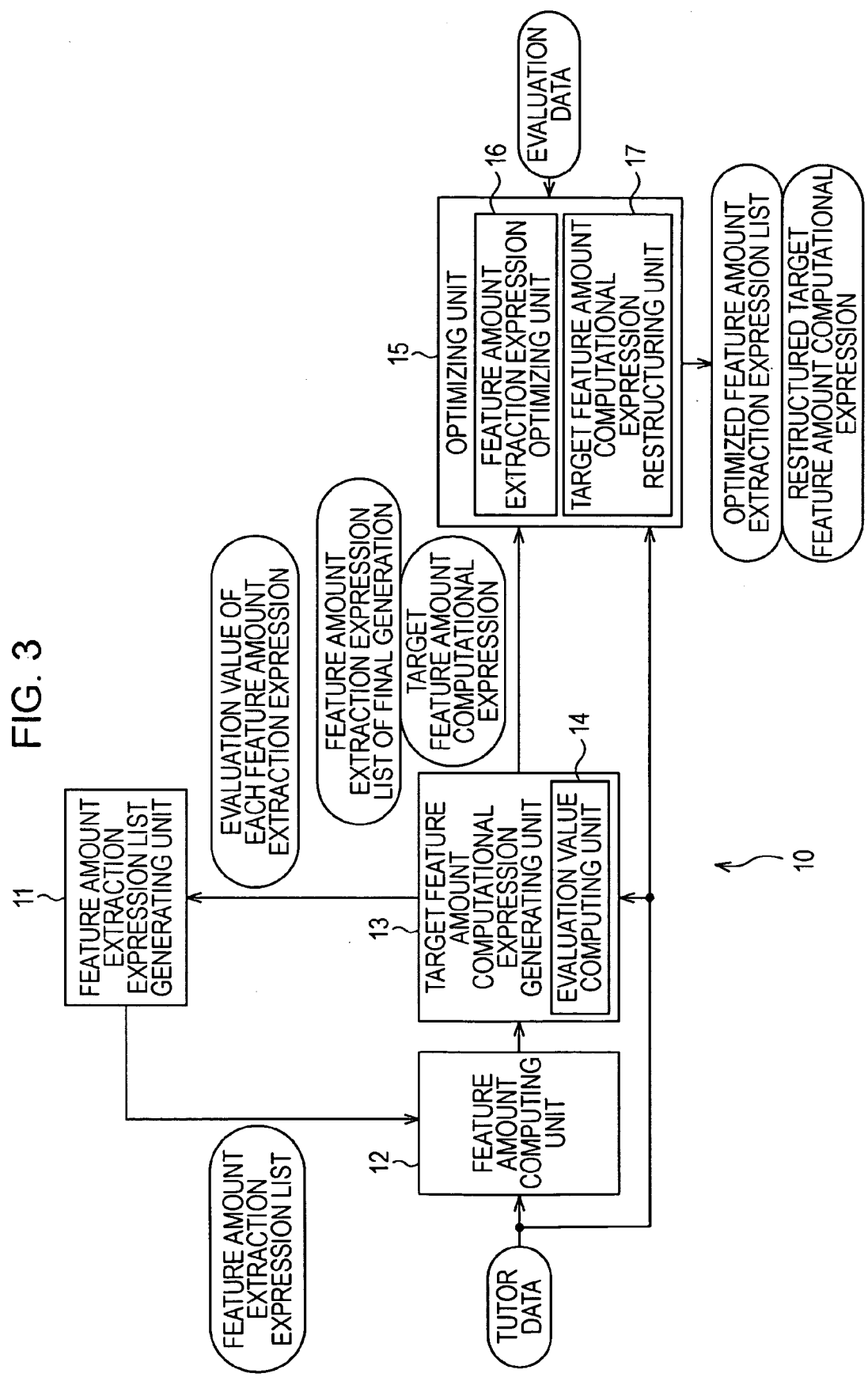
FIG. 3 is a block diagram illustrating a configuration example of a target feature amount computational expression structuring system to which an embodiment of the present invention has been applied.

FIG. 3 illustrates a configuration example of the target feature amount computational expression structuring system 10 to which an embodiment of the present embodiment has been applied. The target feature amount computational expression structuring system 10 is configured of a feature amount extraction expression list generating unit 11 for generating and updating a feature amount extraction expression list made up of multiple feature amount extraction expressions, a feature amount computing unit 12 for substituting the actual data $D_i$ of tutor data $T_i$ for the generated respective feature amount extraction expressions to compute a feature amount, a target feature amount computational expression generating unit 13 for generating a target feature amount computational expression by machine learning whereby target feature amounts $I1_i$ through $Ik_i$ of the tutor data $T_i$ can be estimated from a feature amount corresponding to the tutor data $T_i$ computed by the feature amount computing unit 12, and existing feature amounts $F1_i$ through $Fn_i$ of the tutor data $T_i$, and computing the evaluation value of each of the feature amount extraction expressions, and an optimizing unit 15 for optimizing the feature amount extraction expression list of the final generation and the target feature amount computational expression, which have been ultimately updated.

The feature amount extraction expression list generating unit 11 generates multiple feature amount extraction expressions making up a feature amount extraction expression list of a first generation at random, and outputs these to the feature amount computing unit 12.

Now, description will be made regarding a feature amount extraction expression to be generated by the feature amount extraction expression list generating unit 11 with reference to FIG. 4. FIGS. 4A through 4D illustrate feature amount extraction expression examples, respectively.

With a feature amount extraction expression, the type of input data is described on the left edge, and one or more types of operators are described on the right side of the type of the input data in accordance with the order to be computed. Each operator includes an axis to be processed, and a parameter, as appropriate.

Examples of operators include mean (Mean), fast Fourier transform (FFT), standard deviation (StDev), occurrence ratio (Ratio), low-pass filter (LPF), high-pass filter (HPF), absolute value (ABS), square (Sqr), square root (Sqrt), normalization (Normalize), differentiation (Differential), integration (Integrate), maximum value (MaxIndex), universal dispersion (UVariance), and down sampling (DownSampling). Note that an axis to be processed is fixed depending on the determined operator in some cases, so in this case, the axis to be processed fixed to a parameter is employed. Also, in a case wherein an operator which is accompanied by a parameter has been determined, the parameter is also determined to be a value which has been set at random or beforehand.

Figure 4A:
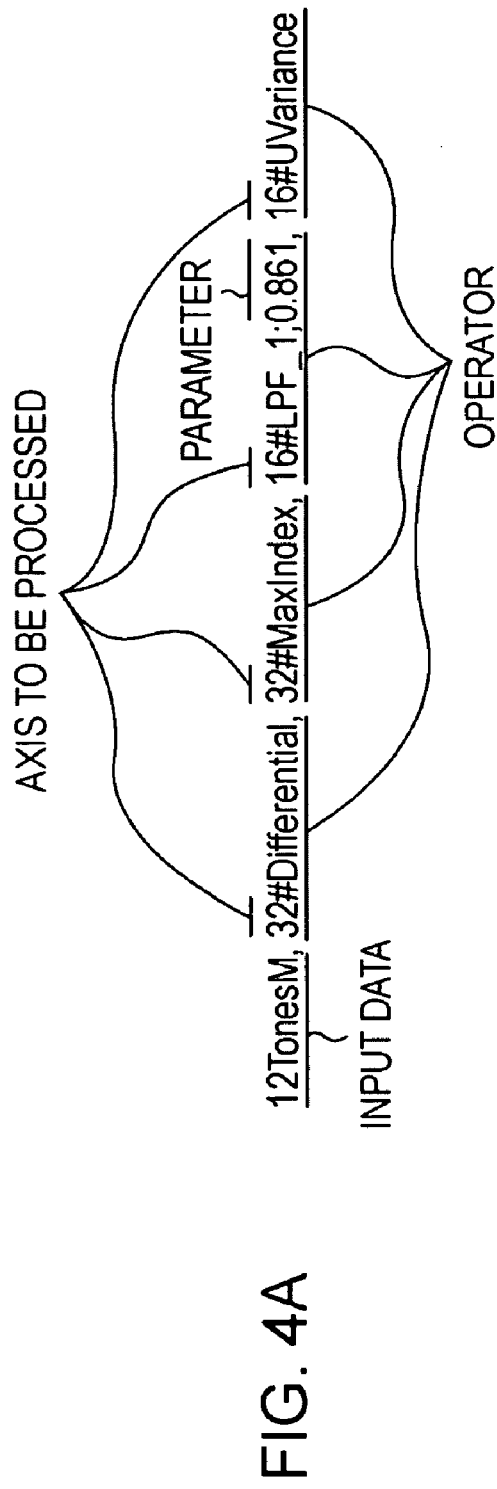
FIG. 4 is a diagram illustrating examples of feature amount extraction expressions.

For example, in the case of the feature amount extraction expression shown in FIG. 4A, 12TonesM is input data, and 32#Differential, 32#MaxIndex, 16#LPF_1; 0.861, and 16#UVariance are each operators. Also, 32#, 16#, and so forth within the respective operators indicate axes to be processed.

Now, 12TonesM indicates that monophonic PCM (pulse coded modulation sound source) waveform data is subjected to musical interval analysis along a temporal axis, 48# indicates a channel axis, 32# indicates a frequency axis and musical interval axis, and 16# indicates a temporal axis. 0.861 of the operator is a parameter of low-pass filter processing, and indicates, for example, the threshold of a frequency which is transmitted.

Figure 5:
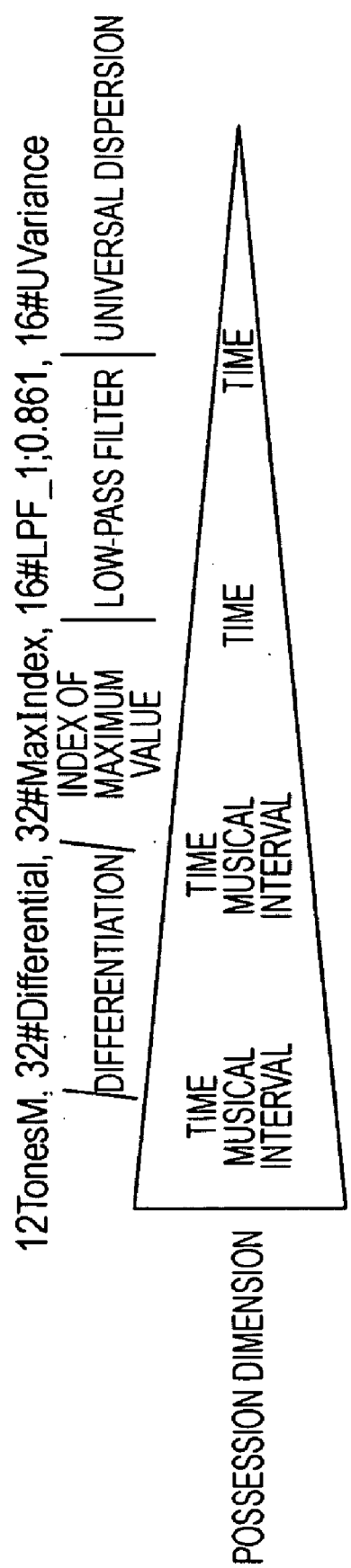
FIG. 5 is a diagram for describing the structure of a feature amount extraction expression.

Note that the type of input data of the respective feature amount extraction expressions making up the feature amount extraction expression list of the first generation is the same as the type of the input data C, the number of operators and the type of an operator are determined at random, but as shown in FIG. 5, a restriction at the time of generating each of the feature amount extraction expressions is made wherein as the arithmetic operations corresponding to multiple operators are executed sequentially, the number of possession dimensions of the arithmetic operation results decreases sequentially, and the ultimate arithmetic operation result of each feature amount extraction expression become a scalar multiple, or the number of dimensions thereof becomes a predetermined small value (e.g., 1, 2, etc.).

As can be understood from the examples shown in FIGS. 4A through 4D, a feature amount computed with a feature amount extraction expression does not become a value determined to be significant with existing concept, such as tempo as to music data, pixel histogram as to image data, or the like, for example. That is to say, a feature amount computed with a feature amount extraction expression may be an arithmetic operation result when simply substituting input data for the feature amount extraction expression.

Now, as shown in FIG. 6, let us say that a feature amount extraction expression list generated by the feature amount extraction expression list generating unit 11 is made up of m feature amount extraction expressions f1 through fm. WavM that is input data of the feature amount extraction expressions f1 through fm is monophonic PCM waveform data, and the possession dimensions are a temporal axis and channel axis.

Now, description will be back to FIG. 3. The feature amount extraction expression list generating unit 11 generates a feature amount extraction expression list of the second generation and thereafter by updating the feature amount extraction expression list of the previous generation in accordance with a genetic algorithm (GA).

Now, "genetic algorithm" means an algorithm for generating genes of the next generation from genes of the current generation using selection processing, intersection processing, mutation processing, and random generation processing. Specifically, selection processing, intersection processing, mutation processing, and random generation processing are performed depending on the evaluation values of multiple feature amount extraction expressions making up the feature amount extraction expression list of the current generation to generate a feature amount extraction expression list of the next generation, regarding the multiple respective feature amount extraction expressions making up the feature amount extraction expression list as genes.

That is to say, for example, as shown in FIG. 7, with the selection processing, of the multiple respective feature amount extraction expressions making up the feature amount extraction expression list of the current generation, a feature amount extraction expression f2 having a high evaluation value is selected, and this is includes in the feature amount extraction expression list of the next generation. With the intersection processing, of the multiple respective feature amount extraction expressions making up the feature amount extraction expression list of the current generation, multiple feature amount extraction expressions f2 and f5 having a high evaluation value are intersected (combined) to generate a feature amount extraction expression, and this is included in the feature amount extraction expression list of the next generation.

With the mutation processing, of the multiple respective feature amount extraction expressions making up the feature amount extraction expression list of the current generation, a feature amount extraction expression f2 having a high evaluation value is partially mutated (changed) to generate a feature amount extraction expression, and includes this in the feature amount extraction expression list of the next generation. With the random generation processing, a new feature amount extraction expression is generated at random, and this is included in the feature amount extraction expression list of the next generation.

Now, description will be back to FIG. 3. The feature amount computing unit 12 substitutes the actual data $D_i$ of the tutor data $T_i$ supplied for the respective feature amount extraction expressions f1 through fm making up the feature amount extraction expression list supplied from the feature amount extraction expression list generating unit 11 to compute a feature amount as to the tutor data $T_i$, and also measure computation time necessary for computation of the respective feature amount extraction expressions f1 through fm, and computes average computation time when performing computation by substituting L pieces of actual data $D_i$ differing for each feature amount extraction expression. The computed feature amount and computed average computation time are supplied to the target feature amount computational expression generating unit 13.

As described above, the number of tutor data $T_i$ is L, and the number of feature amount extraction expressions making up the feature amount extraction expression list is m, and accordingly, (L×m) feature amounts are computed at the feature amount computing unit 12. Hereafter, a feature amount computed by substituting the actual data $D_i$ of the tutor data $T_i$ (i=1, 2, and so on through L) for a feature amount extraction expression fj (j=1, 2, and so on through m) will be referred to as $fj[T_i]$.

The target feature amount computational expression generating unit 13 generates a target feature amount computational expression, which estimates a target feature amount $I1_c$ corresponding to the input data C, for example, by linear coupling between the existing feature amounts $F1_c$ through $Fn_c$ and the feature amounts f1[C] through fm[C] corresponding to the input data C shown in the following Expression (1), by machine learning (linearity discrimination with feature selection, or recursion) employing (L×m) feature amounts $fj[T_i]$ that are calculation results of the feature amount computing unit 12, (L×n) existing feature amounts $F1_i$ through $Fn_i$ included in the tutor data $T_i$, L target feature amounts $I1_i$ included in the tutor data $T_i$ each time (L×m) feature amounts $fj[T_i]$ corresponding to the feature amount extraction expression list of the current generation are supplied from the feature amount computing unit 12.

$$\text{target feature amount } I1_c = b_0 + b_1 \cdot F1_c + b_2 \cdot F2_c + \ldots + b_n \cdot Fn_c + b_{n+1} \cdot f1[C] + b_{n+2} \cdot f2[C] + \ldots + b_{n+m} \cdot fm[C] \quad (1)$$

Note that in Expression (1), $b_0$ is a section, and $b_1$, $b_2$ and so on through $b_{n+m}$ are linear coupling coefficients. Also, with the target feature amount computational expression generated actually at the target feature amount computational expression generating unit 13, not all of the existing feature amounts $F1_c$ through $Fn_c$ and feature amounts f1[C] through fm[C] are employed, but are selectively employed. In this case, the linear coupling coefficients corresponding to the unemployed existing feature amounts $F1_c$ through $Fn_c$ and feature amounts f1[C] through fm[C] are set to zero.

Similarly, a target feature amount computational expression is also generated whereby target feature amounts $I2_c$ through $Ik_c$ corresponding to the input data C can be computed by linear coupling between the existing feature amounts $F1_c$ through $Fn_c$ and the feature amounts f1[C] through fm[C] corresponding to the input data C, respectively.

Accordingly, k target feature amount computational expressions are generate at the target feature amount computational expression generating unit 13.

Subsequently, in a case wherein the generated target feature amount computational expression has reached desired precision, or in a case wherein predetermined instructions have been given by a user, the feature amount extraction expression list at that time is supplied to the optimizing unit 15 as the feature amount extraction expression list of the final generation along with the target feature amount computational expression.

Also, the target feature amount computational expression generating unit 13 employs a built-in evaluation value computing unit 14 to compute the evaluation values of the respective feature amount extraction expressions making up the feature amount extraction expression list of the current generation. That is to say, the evaluation value computing unit 14 computes the contribution ratio of each of the feature amount extraction expressions of each of the k target feature amount computational expressions, and determines a total contribution ratio obtained by totalizing the computed k contribution ratios as the evaluation value of the respective feature amount extraction expressions making up the feature amount extraction expression list of the current generation.

Now, description will be made regarding a contribution ratio calculation method with reference to the following Expression (2). Note that Expression (2) replaces the existing feature amounts $F1_c$ through $Fn_c$ and feature amounts f1[C] through fm[C] with $X_1$, $X_2$, and so on through $X_{n+m}$.

$$\text{target feature amount } I1_c = b_0 + b_1 \cdot X_1 + b_2 \cdot X_2 + \ldots + b_{n+m} \cdot X_{n+m} \quad (2)$$

The contribution ratio $(X_M)$ of $X_M$ (M=1, 2, and so on through n+m) of the computation of the target feature amount $I1_c$ by Expression (2) is computed with the following Expression (3).

$$(X_M)=b_M/\text{StDev}(X_M)\times\text{StDev}(I1)\times\text{Correl}(X_M, I1) \quad (3)$$

Here, $\text{StDev}(X_M)$ represents the standard deviation of the L $X_M(s)$, which has been employed for machine learning.

$\text{StDev}(I1)$ represents the standard deviation of the L target feature amounts $I1_i$ included in the tutor data $T_i$, which has been employed for machine learning.

$\text{Correl}(X_M, I1)$ represents the Pearson's correlation coefficient between the L $X_M(s)$ and the L target feature amounts $I1_i$ included in the tutor data $T_i$, which has been employed for machine learning.

Note that the Pearson's correlation coefficient $\text{Correl}(X_M, I1)$ is computed by dividing the covariance between the L $X_M(s)$ and the L target feature amounts $I1_i$ by the product between the standard deviation of the L $X_M(S)$ and the standard deviation of the L target feature amounts I1, as shown in the following Expression (4).

$$\text{Correl}(X_M, I1) = (\text{covariance between } X_M \text{ and } I1_i)/(\text{standard deviation of } X_M \times \text{standard deviation of } I1_i) \quad (4)$$

Note that the evaluation value computing unit 14 may determine evaluation values of the respective feature amount extraction expressions f1 through fm making up the feature amount extraction expression list of the current generation based on the Pearson's correlation coefficient instead of determining the evaluation values based on the contribution ratios of the feature amounts f1[ ] through fm[ ] that are the output values of the respective feature amount extraction expressions f1 through fm of the target feature amount computational expression, as described above.

For example, an arrangement may be made wherein the Pearson's correlation coefficients between the L feature amounts f1[$D_i$] computed by substituting the actual data Di of the L pieces of tutor data $T_i$ for the feature amount extraction expression f1, and the k types of target feature amounts $I1_i$ through $Ik_i$ of the L pieces of tutor data Ti are computed, and the mean value of the computed k Pearson's correlation coefficients is determined as the evaluation value of the feature amount extraction expression f1.

Also, the evaluation value computing unit 14 may compute not only the evaluation values of the respective feature amount extraction expressions f1 through fm but also the evaluation values of the respective existing feature amounts F1 through Fm.

Further, the evaluation value computing unit 14 corrects the evaluation values of the respective feature amount extraction expressions f1 through fm making up the feature amount extraction expression list of the current generation thus determined based on the average computation time of the respective feature amount extraction expressions f1 through fm supplied from the feature amount computing unit 12. Specifically, the evaluation value computing unit 14 corrects the evaluation value of the feature amount extraction expression of which the average computation time is equal to or greater than a predetermined threshold to the minimum value of the setting range thereof. Subsequently, the evaluation value computing unit 14 informs the feature amount extraction expression list generating unit 11 of the corrected evaluation value.

According to such evaluation value correction, the relevant feature amount extraction expression of which the average computation time is equal to or greater than a predetermined threshold can be prevented from being handed down to the feature amount extraction expression list of the next generation. Accordingly, the computational load of the feature amount computing unit 12 of the next generation and thereafter can be reduced. Note that the predetermined threshold to be compared to the average computation time may be set automatically depending on the computing capabilities of the feature amount computing unit 12, or may be set by a user arbitrarily.

The optimizing unit 15 houses a feature amount extraction expression optimizing unit 16 for optimizing the feature amount extraction expressions f1 through fm making up the feature amount extraction expression list of the final generation supplied form the target feature amount computational expression generating unit 13, and a target feature amount computational expression restructuring unit 17 for restructuring a target feature amount computational expression using the optimized feature amount extraction expressions f1 through fm.

The feature amount extraction expression optimizing unit 16 detects a combination of redundant arithmetic operations registered beforehand (hereafter, referred to as "optimization pattern") from the respective feature amount extraction expressions f1 through fm making up the feature amount extraction expression list of the final generation, and replaces these with an arithmetic operation of which the processing load is small whereby the same arithmetic operation result can be obtained, thereby performing first optimization. Examples of the first optimization will be shown below.

With an optimization pattern wherein two or more operators Abs for computing an absolute value are continued, the second operator Abs and thereafter are redundant, so optimization is performed by replacing the two or more operators Abs with one operator Abs.

With an optimization pattern wherein two or more operators Normalize indicating an normalized arithmetic operation are continued, the second operator Normalize and thereafter are redundant, so optimization is performed by replacing the two or more operators Normalize with one operator Normalize.

With an optimization pattern wherein an operator Sqr indicating a square operation, and an operator Sqrt for computing a square root are continued, optimization is performed by replacing the two operators with an operator Abs of which the processing load is small whereby the same arithmetic operation result can be obtained.

With an optimization pattern wherein an operator Differential indicating a differential operation, and an operator Integrate indicating an integral operation are continued, optimization is performed by eliminating the operators Differential and Integrate, since they are unnecessary.

Note that an optimization pattern and the optimizing method thereof are not restricted to the above-mentioned examples.

Further, the feature amount extraction expression optimizing unit 16 employs a genetic algorithm to perform second optimization so as to obtain the same calculation result with shorter computation time.

The target feature amount computational expression restructuring unit 17 restructures a target feature amount computational expression by machine learning employing the optimized feature amount extraction expressions f1 through fm and tutor data.

Next, description will be made regarding the operation of the target feature amount computational expression structuring system 10 with reference to the flowchart shown in FIG. 8.

In step S1, the feature amount extraction expression list generating unit 11 generates m feature amount extraction expressions making up a feature amount extraction expression list of a first generation at random, and supplies the feature amount extraction expression list made up of the m feature amount extraction expressions to the feature amount computing unit 12.

In step S2, the target feature amount computational expression structuring system 10 obtains tutor data $T_i$ (i=1, 2, and so on through L). The obtained tutor data $T_i$ is supplied to the target feature amount computational expression generating unit 13 and optimizing unit 15.

In step S3, the feature amount computing unit 12 substitutes actual data $D_i$ included in the tutor data $T_i$ for the respective feature amount extraction expressions f1 through fm making up the feature amount extraction expression list supplied from the feature amount extraction expression list generating unit 11 to compute (L×m) feature amounts fj[$T_i$], and also measures computation time necessary for computation of the respective feature amount extraction expressions f1 through fm, and computes average computation time when performing computation by substituting different L pieces of actual data $D_i$ for each feature amount extraction expression. The computed (L×m) feature amounts fj[$T_i$] and the average computation time corresponding to each of the feature amount extraction expressions f1 through fm are supplied to the target feature amount computational expression generating unit 13.

In step S4, the target feature amount computational expression generating unit 13 learns a target feature amount computational expression for estimating L target feature amounts $I1_i$ included in the tutor data $T_i$ from the (L×m) feature amounts fj[$T_i$] that are calculation results by the feature amount computing unit 12, and (L×n) existing feature amounts $F1_i$ through $Fn_i$ by linearity discrimination with feature selection, or recursion.

Description will be made in detail regarding the processing in step S4 (hereafter, referred to as learning processing) by the target feature amount computational expression generating unit 13 with reference to the flowchart shown in FIG. 9.

In step S21, when generating a target feature amount computational expression, the target feature amount computational expression generating unit 13 generates multiple selection tables TB at random, which indicate something used (selected) and something unused (unselected) of n existing feature amounts F1 through Fn and feature amounts f1[ ] through fm[ ] that are output of m feature amount extraction expressions f1 through fm, thereby generating a selection table group of a first generation. This selection table group will be updated in later-described step S29 based on a genetic algorithm, regarding the multiple selection tables TB making up the selection table group as genes.

FIG. 10 illustrates an example of a selection table group made up of multiple selection tables TB to be generated. Note that, in FIG. 10, round marks denote selected, and X-marks denote unselected.

In step S22, the target feature amount computational expression generating unit 13 starts a selection table group loop while having an interest in the respective selection tables TB making up a selection table group of the current generation one at a time in order. Note that the selection table group loop is repeated by the number of the selection table TB making up the selection table group (by x in the example shown in FIG. 10).

In step S23, the target feature amount computational expression generating unit 13 employs the average computation time corresponding to each of the feature amount extraction expressions f1 through fm supplied from the feature amount computing unit 12 to determine whether or not the total of the average computation time of the feature amount extraction expression fj corresponding to the feature amount fj[ ] selected with the selection table TB of interest is equal to or smaller than a predetermined threshold. The predetermined threshold to be compared to the total of the average computation time may be set automatically depending on the computing capabilities of the target feature amount computational expression generating unit 13 or the like, or may be set by a user arbitrarily.

In a case wherein determination is made that the total of the average computation time is equal to or smaller than a predetermined threshold, the processing proceeds to step S24.

In step S24, the target feature amount computational expression generating unit 13 learns target feature amount computational expressions of which the number is equal to the number (k) of types of target feature amount by linearity discrimination or recursion employing some selected with the selection table TB of interest, of the (L×m) feature amounts fj[$T_i$] that are calculation results by the feature amount computing unit 12, and (L×n) existing feature amounts $F1_i$ through $Fn_i$ included in the tutor data $T_i$.

In step S25, the target feature amount computational expression generating unit 13 computes Akaike's information criteria (AIC) of the learning results by the processing in step S24 as the evaluation value of the selection table TB of interest.

Note that in a case wherein determination is made in step S23 that the total of the average computation time of the feature amount extraction expression fj corresponding to the feature amount fj[ ] selected with the selection table TB of interest is greater than a predetermined threshold, the processing proceeds to step S26. In step S26, the target feature amount computational expression generating unit 13 sets the evaluation value of the selection table TB of interest to the minimum value of the setting range thereof. Thus, a selection table of which the total of the average computation time is longer than a predetermined threshold is prevented from being handed down to the next generation, whereby time necessary for computing a target feature amount computational expression to be generated can be prevented from being prolonged.

Following the evaluation value of the selection table TB of interest being determined by the processing in step S25 or step S26, the processing proceeds to step S27. In step S27, the target feature amount computational expression generating unit 13 determines whether to have had an interest in all of the selection tables TB making up the selection table group of the current generation, and in a case wherein there is a selection table TB in which an interest has not been put, the processing returns to step S22, where the processing in step S22 through S27 is repeated. Subsequently, in step S27, in a case wherein an interest has been put in all of the selection tables TB making up the selection table group of the current generation, the processing proceeds to step S28.

In step S28, the target feature amount computational expression generating unit 13 determines whether or not the evaluation value of the selection table TB having the most sufficient evaluation has not been improved for a predetermined several generations. Subsequently, in a case wherein determination is made that the evaluation value of the selection table TB having the most sufficient evaluation has been improved, or in a case wherein determination is made that a predetermined several generations have not elapsed since improvement in the evaluation value stopped, the processing proceeds to step S29.

In step S29, the target feature amount computational expression generating unit 13 generates a selection table group of the next generation by updating the selection table group of the current generation using a genetic algorithm based on the evaluation value of each of the selection tables TB. The processing returns to step S22, where the subsequent processing is repeated.

Subsequently, in step S28, in a case wherein determination is made that the evaluation value of the selection table TB having the most sufficient evaluation has not been improved for a predetermined several generations, the processing proceeds to step S5 shown in FIG. 8.

According to the above-mentioned learning processing, a target feature amount computational expression for computing each of the k types of target feature amount corresponding to the feature amount extraction expression list of the current generation has been generated.

Note that, with the above-mentioned description, description has been made assuming that a genetic search method and AIC are employed for the learning processing, but the learning processing may be performed employing a different method. Also, local search may be employed instead of a genetic algorithm to determine selection or nonselection of an existing feature amount or the output value of a feature amount extraction expression.

For example, in the case of employing local search, learning is started with all of the n existing feature amounts F1 through Fn and the feature amounts f1[ ] through fm[ ] that are the outputs of the m feature amount extraction expressions f1 through fm as nonselection. Subsequently, (n+m) selection tables are generated with one of the n existing feature amounts F1 through Fn and the feature amounts f1[ ] through fm[ ] that are the outputs of the m feature amount extraction expressions f1 through fm as selection, and the others as nonselection, and evaluation is performed as to each of the selection tables using AIC. Subsequently, a selection table having the most sufficient evaluation, i.e., having a small AIC value is determined. Further, (n+m) selection tables are generated with one of the n existing feature amounts F1 through Fn and the feature amounts f1[ ] through fm[ ] that are the outputs of the m feature amount extraction expressions f1 through fm as selection, and the others as nonselection, and evaluation is performed as to each of the selection tables using AIC or the like. The above-mentioned processing is preferably repeated until improvement in evaluation of AIC or the like stops.

Now description will be back to FIG. 8. In step S5, the evaluation value computing unit 14 of the target feature amount computational expression generating unit 13 computes the contribution ratios of the feature amounts f1[ ] through fm[ ] that are the computation results of the respective feature amount extraction expressions f1 through fm of the k respective target feature amount computational expressions generated at the current point, and determines a total contribution ratio obtained by totalizing the computed k contribution ratios as the evaluation values of the respective feature amount extraction expressions f1 through fm making up the feature amount extraction expression list of the current generation.

Note that, in step S5, the evaluation values of the respective feature amount extraction expressions f1 through fm making up the feature amount extraction expression list of the current generation may be determined based on the Pearson's correlation coefficient instead of being determined based on the contribution ratios of the feature amounts f1[ ] through fm[ ] that are the outputs of the respective feature amount extraction expressions f1 through fm of the target feature amount computational expressions, as described above.

In step S6, the evaluation value computing unit 14 corrects the evaluation values of the respective feature amount extraction expressions f1 through fm making up the feature amount extraction expression list of the current generation determined in the processing in step S5 based on the average computation time of the respective feature amount extraction expressions f1 through fm supplied from the feature amount computing unit 12. Specifically, the evaluation value computing unit 14 corrects the evaluation value of the feature amount extraction expression of which the average computation time is equal to or greater than a predetermined threshold to the minimum value of the setting range thereof. Subsequently, the evaluation value computing unit 14 informs the feature amount extraction expression list generating unit 11 of the corrected evaluation value.

In step S7, the target feature amount computational expression generating unit 13 determines whether or not the computation result by the target feature amount computational expression generated at the current point has reached desired precision, or whether or not the user has performed end operations. In a case wherein determination is made that the computation result has not reached desired precision, and also the user has not performed end operations, the processing proceeds to step S8.

In step S8, the feature amount extraction expression list generating unit 11 generates a feature amount extraction expression list of the next generation by updating the feature amount extraction expression list of the current generation in accordance with a genetic algorithm. Subsequently, the processing returns to step S3, where the processing in step S3 and thereafter is repeated.

Subsequently, in a case wherein determination is made in step S7 that the computation result from the target feature amount computational expression currently generated has reached desired precision, or the user has performed end operations, the processing proceeds to step S9.

In step S9, the target feature amount computational expression generating unit 13 outputs the feature amount extraction expression list of the current generation, and target feature amount computational expression generated at the current point to the optimizing unit 15 as the feature amount extraction expression list of the final generation and the k target feature amount computational expressions corresponding thereto.

In step S10, the optimizing unit 15 optimizes the respective feature amount extraction expressions f1 through fm of the feature amount extraction expression list of the final generation input from the target feature amount computational expression generating unit 13, and also restructures a target feature amount computational expression employing the optimized respective feature amount extraction expressions f1 through fm.

Description will be made in detail regarding the processing in step S10 by the optimizing unit 15 with reference to the flowchart shown in FIG. 11.

In step S41, the feature amount extraction expression optimizing unit 16 detects an optimization pattern from the respective feature amount extraction expressions f1 through fm making up the feature amount extraction expression list of the final generation, and performs first optimization for replacing an arithmetic operation of which the processing load is great with an arithmetic operation of which the processing load is small whereby the same arithmetic operation result can be obtained.

In step S42, the feature amount extraction expression optimizing unit 16 applies a genetic algorithm to the respective feature amount extraction expressions f1 through fm after the first optimization so as to obtain the same computation results with shorter computation time, thereby performing second optimization.

Figure 12:
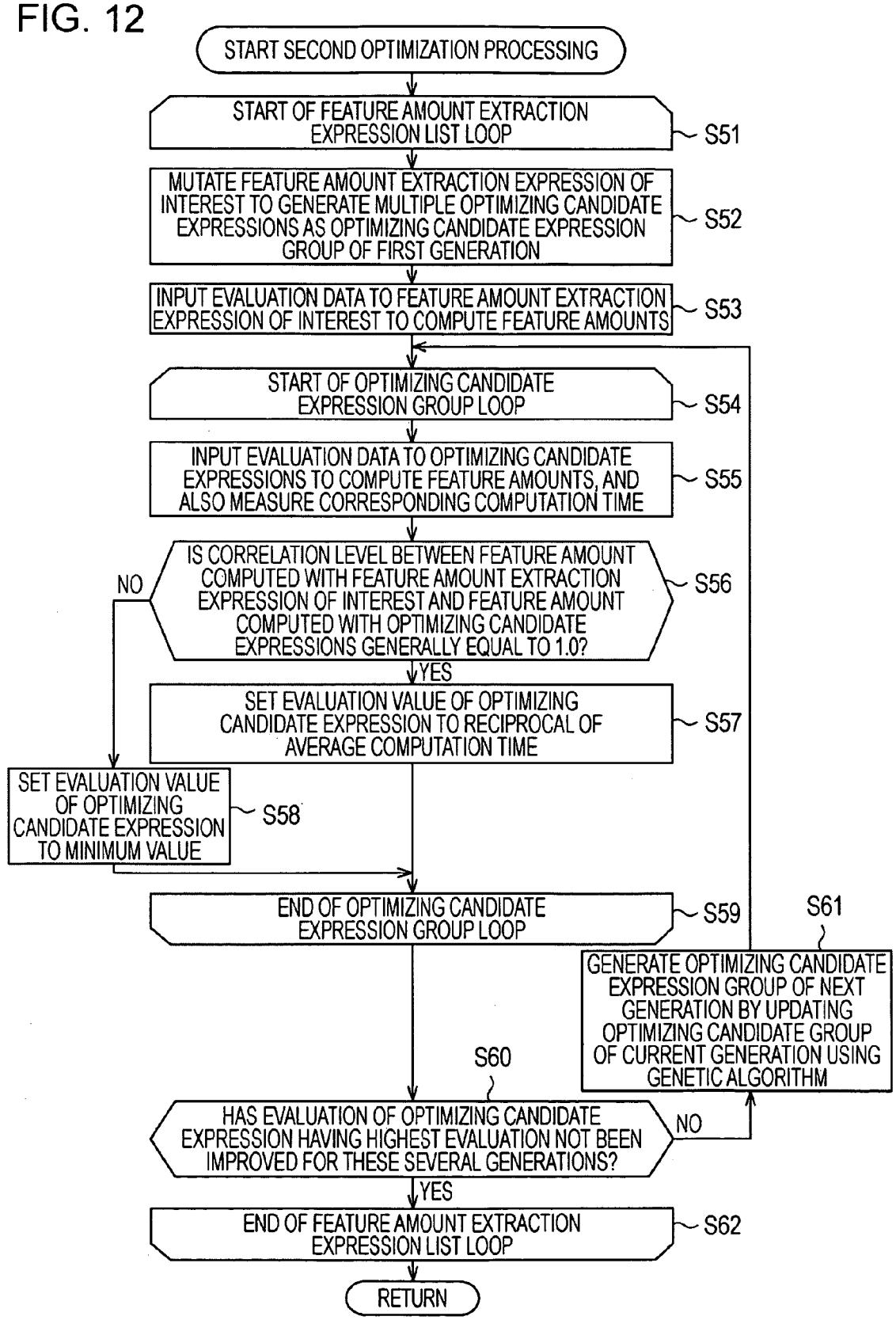
FIG. 12 is a flowchart for describing step S42 shown in FIG. 11 in detail.

Description will be made in detail regarding the processing in step S42 by the feature amount extraction expression optimizing unit 16 with reference to the flowchart shown in FIG. 12.

In step S51, the feature amount extraction expression optimizing unit 16 starts a feature amount extraction expression list loop while having an interest in the respective feature amount extraction expressions f1 through fm making up the feature amount extraction expression list of the final generation after the first optimization one at a time in order. Note that the feature amount extraction expression list loop is repeated by the number m of the feature amount extraction expressions f1 through fm making up the feature amount extraction expression list.

In step S52, the feature amount extraction expression optimizing unit 16 mutates a part of a feature amount extraction expression fj of interest to generate R optimizing candidate expressions $fj'_r$ (r=1, 2, and so on through R), and determines these as an optimizing candidate expression group of a first generation.

In step S53, the feature amount extraction expression optimizing unit 16 substitutes S pieces of evaluation data (the data having the same type of the input data C) for the feature amount extraction expression fj of interest to compute S feature amounts fj[ ].

In step S54, the feature amount extraction expression optimizing unit 16 starts an optimizing candidate expression group loop while having an interest in the R optimizing candidate expressions making up the optimizing candidate expression group of the current generation one at a time in order. Note that the optimizing candidate expression group loop is repeated by the number of the optimizing candidate expressions making up the optimizing candidate expression group.

In step S55, the feature amount extraction expression optimizing unit 16 substitutes S pieces of evaluation data employed in step S53 for an optimizing candidate expression $fj'_r$ of interest to compute S feature amounts $fj'_r$[ ], and also measures computation time when substituting the respective pieces of evaluation data, and further computes average computation time.

In step S56, the feature amount extraction expression optimizing unit 16 computes the Pearson's correlation coefficient indicating the degree of correlation between the S feature amounts fj[ ] that are the processing results in step S53 and the S feature amounts $fj'_r$[ ] that are the processing results in step S55, and determines whether or not the degree of correlation between the S feature amounts fj[ ] and the S feature amounts $fj'_r$[ ] is approximately 1.0. Subsequently, in a case wherein determination is made that the degree of correlation between the S feature amounts fj[ ] and the S feature amounts $fj'_r$[ ] is approximately 1.0, the processing proceeds to step S57.

In step S57, the feature amount extraction expression optimizing unit 16 sets the reciprocal of the average computation time computed in the processing in step S55 as the evaluation value of the optimizing candidate expression fj' of interest.

Note that determination is made in step S56 whether or not the degree of correlation between the S feature amounts fj[ ] and the S feature amounts $fj'_r$[ ] is approximately 1.0. Subsequently, in a case wherein determination is made that the degree of correlation between the S feature amounts fj[ ] and the S feature amounts $fj'_r$[ ] is not approximately 1.0, the processing proceeds to step S58.

In step S58, the feature amount extraction expression optimizing unit 16 sets the evaluation value of the optimizing candidate expression fj' of interest to the minimum value of the range thereof.

Following the evaluation value of the optimizing candidate expression $fj'_r$ of interest being determined by the processing in step S57 or step S58, the processing proceeds to step S59.

In step S59, the feature amount extraction expression optimizing unit 16 determines whether to have had an interest in all of the optimizing candidate expressions $fj'_r$ making up the optimizing candidate expression group of the current generation, and in a case wherein there is an optimizing candidate expression $fj'_r$ in which an interest has not been put, the processing returns to step S54, where the processing in steps S54 through 359 is repeated. Subsequently, in step S59, in a case wherein an interest has been put in all of the optimizing candidate expressions $fj'_r$ making up the optimizing candidate expression group of the current generation, the processing proceeds to step S60.

In step S60, the feature amount extraction expression optimizing unit 16 determines whether or not the evaluation value of the optimizing candidate expression having the most sufficient evaluation has not been improved for a predetermined several generations. Subsequently, in a case wherein determination is made that the evaluation value of the optimizing candidate expression having the most sufficient evaluation has been improved, or in a case wherein determination is made that a predetermined several generations have not elapsed since improvement in the evaluation value stopped, the processing proceeds to step S61.

In step S61, the feature amount extraction expression optimizing unit 16 generates an optimizing candidate expression group of the next generation by updating the optimizing candidate expression group of the current generation using a genetic algorithm based on the evaluation value of each of the optimizing candidate expressions $fj'_r$. Note however, an arrangement is made wherein the optimizing candidate expression having the most sufficient evaluation is included in the optimizing candidate expression group of the next generation, and the remaining (R-1) optimizing candidate expressions are generated by mutating a part of each of the optimizing candidate expression of the previous generation having the most sufficient evaluation, and the feature amount extraction expression fj of interest. The processing returns to step S54, where the subsequent processing is repeated.

Subsequently, in a case wherein determination is made in step S60 that the evaluation value of the optimizing candidate expression having the most sufficient evaluation has not been improved for a predetermined several generations, the processing proceeds to step S62.

According to the processing in steps S52 through S60, one of all of the feature amount extraction expressions making up the feature amount extraction expression list of the final generation after the first optimization has been subjected to the second optimization.

In step S62, the feature amount extraction expression optimizing unit 16 determines whether to have had an interest in all of the feature amount extraction expressions f1 through fm making up the feature amount extraction expression list of the final generation after the first optimization, and in a case wherein there is a feature amount extraction expression fj in which an interest has not been put, the processing returns to step S51, where the processing in steps S51 through S62 is repeated. Subsequently, in step S62, in a case wherein an interest has been put in all of the feature amount extraction expressions f1 through fm making up the feature amount extraction expression list of the final generation after the first optimization, this means that all of the feature amount extraction expressions f1 through fm making up the feature amount extraction expression list of the final generation after the first optimization have been subjected to the second optimization, so the processing proceeds to step S43 shown in FIG. 11.

Figure 11:
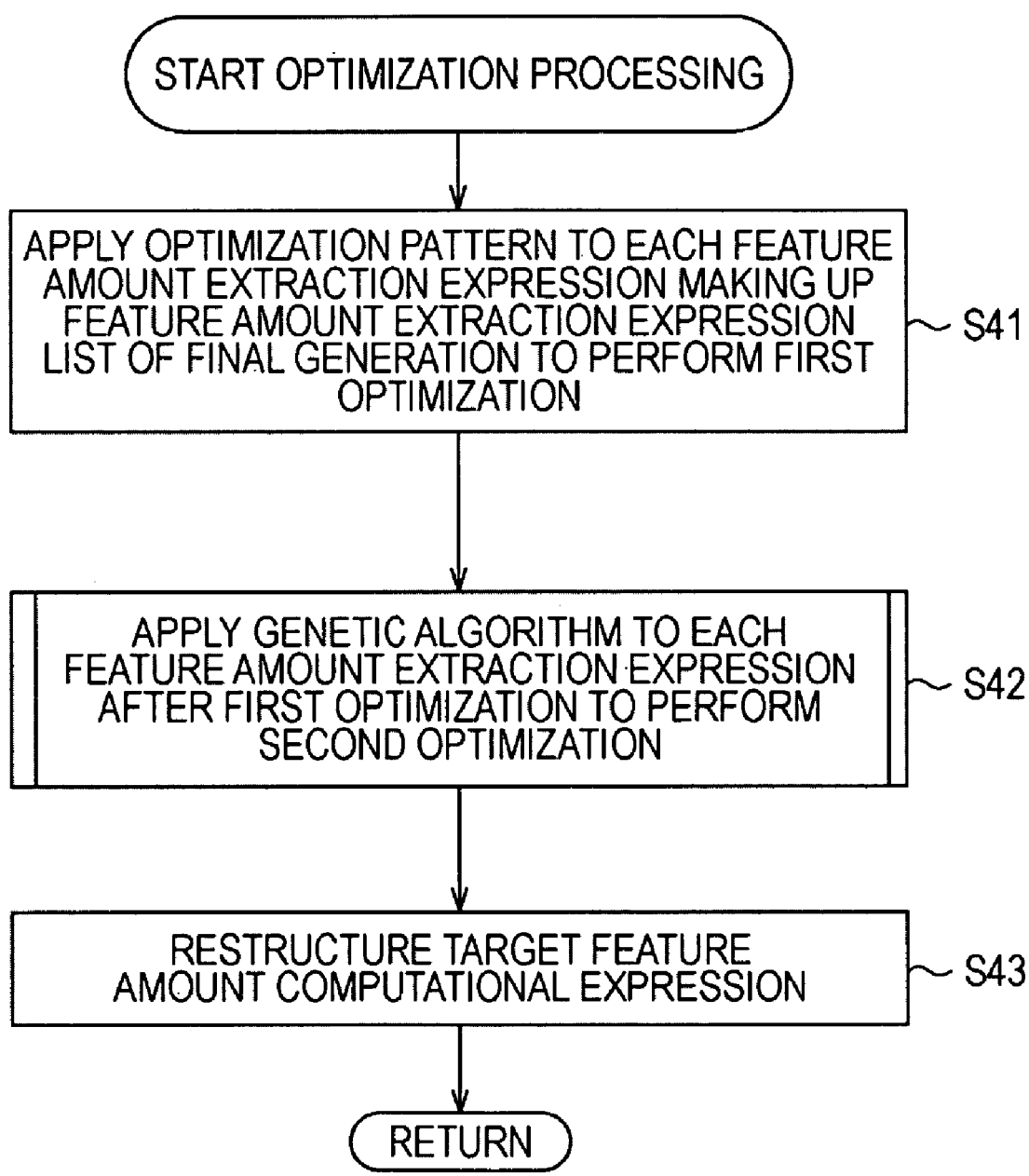
FIG. 11 is a flowchart for describing step S10 shown in FIG. 8 in detail.

Now, description will be back to FIG. 11. In step S43, the target feature amount computational expression restructuring unit 17 restructures the k target feature amount computational expressions supplied from the target feature amount computational expression generating unit 13 by statistical analysis and machine learning based on the feature amount extraction expressions f1 through fm subjected to the second optimization, and the tutor data. Subsequently, the ultimate feature amount extraction expression list and target feature amount computational expression are output, and the operation of the target feature amount computational expression structuring system 10 ends.

Explanation of the operation of the target feature amount computational expression structuring system 10 is ended now.

As described above, according to the target feature amount computational expression structuring system 10 to which an embodiment of the present invention has been applied, a target feature amount computational expression is automatically structured using existing feature amounts, whereby the number of feature amount extraction expressions, which have tendency to become redundant, can be reduced as compared to a case wherein a target feature amount computational expression is structured only employing the computation result of a feature amount computational expression. Thus, the processing amount of arithmetic operations can be reduced when computing a target feature amount from a target feature amount computational expression.

Also, according to the target feature amount computational expression structuring system 10 to which an embodiment of the present invention has been applied, the genes of a feature amount computational expression of which the computation time is long are prevented by a genetic algorithm from handing down to posterity, whereby a target feature amount computational expression of which the arithmetic operation time is restricted can be structured. Also, the structuring time of a target feature amount computational expression can be shortened.

Further, according to the target feature amount computational expression structuring system 10 to which an embodiment of the present invention has been applied, feature amount extraction expressions making up a feature amount extraction expression list are optimized, whereby the processing amount of arithmetic operations can be reduced when computing a target feature amount from a target feature amount computational expression.

Incidentally, the above-mentioned series of processing can be realized by hardware, and also can be realized by software. In the case of realizing the series of processing by software, a program making up the software thereof is installed from a program recording medium to a computer embedded in dedicated hardware, or a general-purpose personal computer or the like capable of executing various types of functions by installing various types of program, for example.

Figure 13:
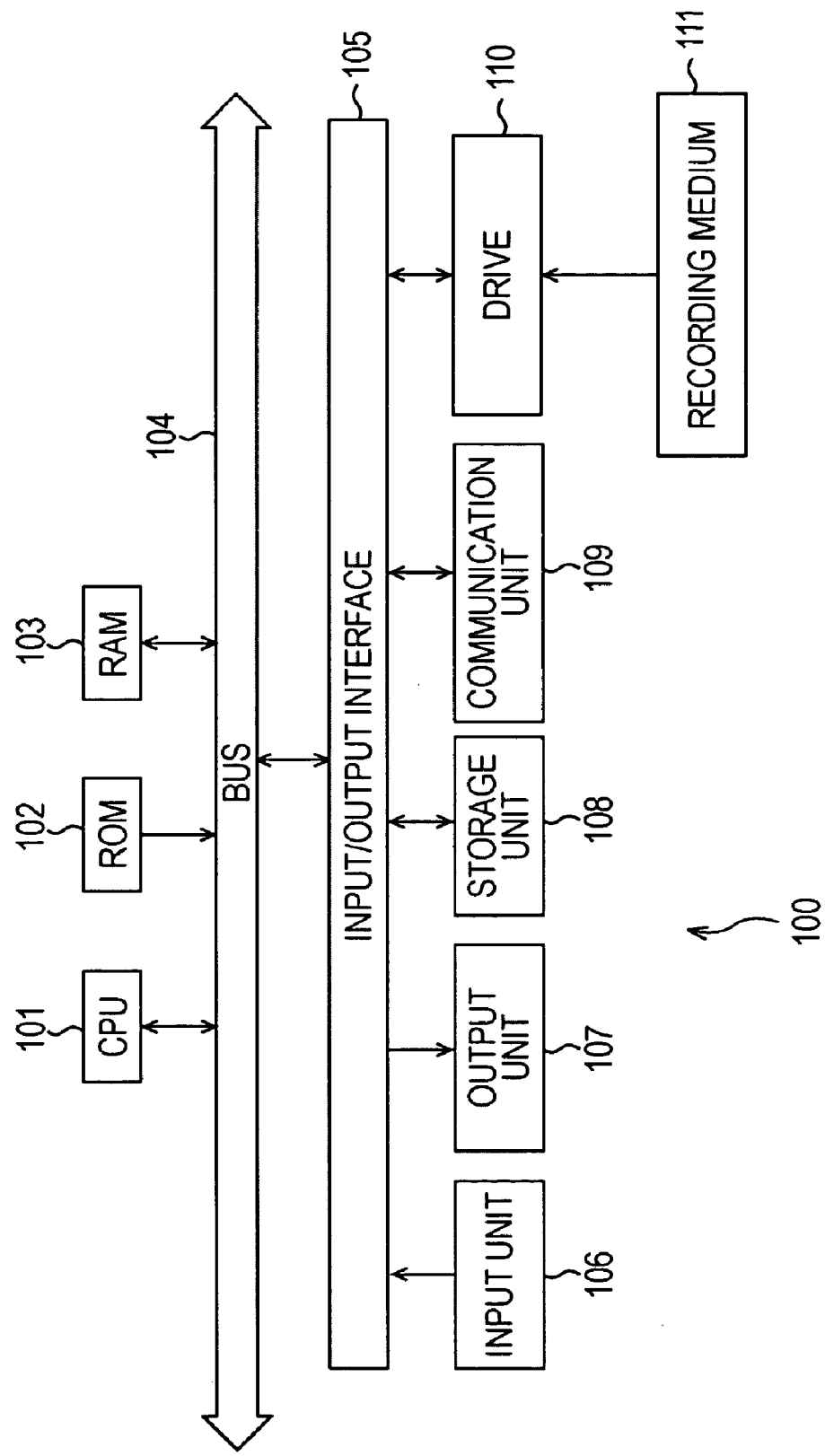
FIG. 13 is a block diagram illustrating a configuration example of a computer.

FIG. 13 is a block diagram illustrating a hardware configuration example of a computer which executes the above-mentioned series of processing using a program.

With this computer 100, a CPU (Central Processing Unit) 101, ROM (Read Only Memory) 102, and RAM (Random Access Memory) 103 are mutually connected by a bus 104.

An input/output interface 105 is further connected to the bus 104. The input/output interface 105 is connected with an input unit 106 made up of a keyboard, mouse, microphone, and so forth, an output unit 107 made up of a display, speaker, and so forth, a storage unit 108 made up of a hard disk, nonvolatile memory, and so forth, a communication unit 109 made up of a network interface, and a drive 110 which drives a detachable recording medium 111 such as a magnetic disk, optical disc, magneto-optical disk, semiconductor memory, or the like.

With the computer thus configured, the CPU 101 executes, for example, the program stored in the storage unit 108 by loading the program in the RAM 103 through the input/output interface 105 and bus 104, thereby performing the above-mentioned series of processing.

Note that the program executed by the computer may be a program where processing is performed in time sequence along the order described in the present Specification, or may be a program wherein processing is preformed in parallel, or at necessary timing such as at the time of being called, or the like.

Also, the program may be processed by a single computer, or may be processed in a distributed manner by multiple computers. Further, the program may be transferred to a remote computer for execution.

Also, with the present Specification, the term "system" represents the entire device configured of multiple devices.

Note that the embodiments of the present invention are not restricted to the above-mentioned embodiment, and various modifications can be performed without departing from the essence of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device for taking input data and an existing feature amount corresponding to said input data as input, and generating a target feature amount computational expression for outputting a target feature amount corresponding to said input data, comprising:

feature amount extraction expression list generating means configured to generate a feature amount extraction expression list including a plurality of feature amount extraction expressions made up of a plurality of operators by updating said feature amount extraction expression list of the previous generation using a genetic algorithm based on the evaluation values of said feature amount extraction expressions, regarding a plurality of feature amount extraction expressions included in said feature amount extraction expression list of the previous generation as genes;

feature amount computing means configured to input actual data supplied as tutor data to each feature amount extraction expression included in said feature amount extraction expression list to compute a plurality of feature amounts corresponding to said actual data;

target feature amount computational expression generating means configured to employ said plurality of feature amounts corresponding to said computed actual data, and an existing feature amount corresponding to said actual data supplied as tutor data for the same rank to generate said target feature amount computational expression by machine learning for estimating a target feature amount corresponding to said actual data supplied as tutor data;

evaluation value computing means configured to compute said evaluation value of each feature amount extraction expression included in said feature amount extraction expression list; and optimizing means configured to optimize each of plurality of feature amount extraction expressions included in said feature amount extraction expression list of the final generation.

2. The information processing device according to claim 1, wherein said target feature amount computational expression generating means selectively employ some of said plurality of feature amounts corresponding to said computed actual data, and some of a plurality of existing feature amount corresponding to said actual data supplied as tutor data for the same rank to generate said target feature amount computational expression by machine learning for estimating said target feature amount corresponding to said actual data supplied as tutor data.

3. The information processing device according to claim 1, wherein said evaluation value computing means compute said evaluation value of each feature amount extraction expression included in said feature amount extraction expression list based on a contribution ratio of said target feature amount computational expression of said plurality of feature amounts corresponding to said computed actual data.

4. An information processing device for generating a target feature amount computational expression for outputting a target feature amount corresponding to input data, comprising:
   feature amount extraction expression list generating means configured to generate a feature amount extraction expression list including a plurality of feature amount extraction expressions made up of a plurality of operators by updating said feature amount extraction expression list of the previous generation using a genetic algorithm based on the evaluation values of said feature amount extraction expressions, regarding a plurality of feature amount extraction expressions included in said feature amount extraction expression list of the previous generation as genes;
   feature amount computing means configured to input actual data supplied as tutor data to each feature amount extraction expression included in said feature amount extraction expression list to compute a plurality of feature amounts corresponding to said actual data, and also measure average computation time of the respective feature amount extraction expressions;
   target feature amount computational expression generating means configured to employ said plurality of feature amounts corresponding to said computed actual data to generate said target feature amount computational expression by machine learning for estimating a target feature amount corresponding to said actual data supplied as tutor data; and
   evaluation value computing means configured to compute said evaluation value of each feature amount extraction expression included in said feature amount extraction expression list, and also correct said computed evaluation value based on the average computation time of the respective feature amount extraction expressions.

5. The information processing device according to claim 4, wherein said target feature amount computational expression generating means selectively employ some of said plurality of feature amounts corresponding to said computed actual data to generate said target feature amount computational expression by machine learning for estimating said target feature amount corresponding to said actual data supplied as tutor data.

6. The information processing device according to claim 5, wherein said target feature amount computational expression generating means selectively employ some of said plurality of feature amounts corresponding to said computed actual data based on the average computation time of the corresponding feature amount extraction expression to generate said target feature amount computational expression by machine learning for estimating said target feature amount corresponding to said actual data supplied as tutor data.

7. An information processing device for generating a target feature amount computational expression for outputting a target feature amount corresponding to input data, comprising:
   feature amount extraction expression list generating means configured to generate a feature amount extraction expression list including a plurality of feature amount extraction expressions made up of a plurality of operators by updating said feature amount extraction expression list of the previous generation using a genetic algorithm based on the evaluation values of said feature amount extraction expressions, regarding a plurality of feature amount extraction expressions included in said feature amount extraction expression list of the previous generation as genes;
   feature amount computing means configured to input actual data supplied as tutor data to each feature amount extraction expression included in said feature amount extraction expression list to compute a plurality of feature amounts corresponding to said actual data;
   target feature amount computational expression generating means configured to employ said plurality of feature amounts corresponding to said computed actual data to generate said target feature amount computational expression by machine learning for estimating a target feature amount corresponding to said actual data supplied as tutor data; evaluation value computing means configured to compute said evaluation value of each feature amount extraction expression included in said feature amount extraction expression list; and
   optimizing means configured to optimize each of plurality of feature amount extraction expressions included in said feature amount extraction expression list of the final generation.

8. The information processing device according to claim 7, said optimizing means comprising:
   feature amount extraction expression optimizing means configured to optimize each feature amount extraction expression included in said feature amount extraction expression list of the final generation by detecting an optimization pattern indicating a combination of redundant operators registered beforehand from the respective feature amount extraction expressions included in said feature amount extraction expression list of the final generation, and deleting an operator or replacing with an operator of which the arithmetic load is smaller.

9. The information processing device according to claim 7, said optimizing means comprising:
   feature amount extraction expression optimizing means configured to deform each feature amount extraction expression included in said feature amount extraction expression list of the final generation to generate a plurality of optimizing candidate expressions, give an excellent evaluation to one of said plurality of generated optimizing candidate expressions of which the output having a high degree of correlation with the output of said feature amount extraction expression which is a deformation source is obtained, and of which the computation time is shorter, regard said plurality of generated optimizing candidate expressions as genes, employ a genetic algorithm based on the evaluation of said optimizing candidate expressions to update said plurality of generated optimizing candidate expressions, and ultimately determines said optimizing candidate expression having the most excellent evaluation as the optimization result of the respective feature amount extraction expressions included in said feature amount extraction expression list of the final generation.

10. The information processing device according to claim 7, said optimizing means comprising:
restructuring means configured to employ said optimized feature amount extraction expression to restructure said target feature amount computational expression generated corresponding to said feature amount extraction expression list of the final generation.

11. An information processing method for taking input data and an existing feature amount corresponding to said input data as input, and generating a target feature amount computational expression for outputting a target feature amount corresponding to said input data, comprising the steps of:
generating a feature amount extraction expression list including a plurality of feature amount extraction expressions made up of a plurality of operators at random;
inputting actual data supplied as tutor data to each feature amount extraction expression included in said feature amount extraction expression list to compute a plurality of feature amounts corresponding to said actual data;
employing said plurality of feature amounts corresponding to said computed actual data, and an existing feature amount corresponding to said actual data supplied as tutor data for the same rank to generate said target feature amount computational expression by machine learning for estimating a target feature amount corresponding to said actual data supplied as tutor data;
computing said evaluation value of each feature amount extraction expression included in said feature amount extraction expression list; and
generating said feature amount extraction expression list of the next generation by updating said feature amount extraction expression list of the previous generation using a genetic algorithm based on the evaluation values of said feature amount extraction expressions, regarding a plurality of feature amount extraction expressions included in said feature amount extraction expression list of said previous generation as genes.

12. An information processing method for generating a target feature amount computational expression for outputting a target feature amount corresponding to input data, comprising the steps of:
generating a feature amount extraction expression list including a plurality of feature amount extraction expressions made up of a plurality of operators at random;
inputting actual data supplied as tutor data to each feature amount extraction expression included in said feature amount extraction expression list to compute a plurality of feature amounts corresponding to said actual data, and also measure the average computation time of the respective feature amount extraction expressions;
employing said plurality of feature amounts corresponding to said computed actual data to generate said target feature amount computational expression by machine learning for estimating a target feature amount corresponding to said actual data supplied as tutor data;
computing said evaluation value of each feature amount extraction expression included in said feature amount extraction expression list, and also correcting said computed evaluation value based on the average computation time of the respective feature amount extraction expressions; and
generating said feature amount extraction expression list of the next generation by updating said feature amount extraction expression list of the previous generation using a genetic algorithm based on the evaluation values of said feature amount extraction expressions, regarding a plurality of feature amount extraction expressions included in said feature amount extraction expression list of said previous generation as genes.

13. An information processing method for generating a target feature amount computational expression for outputting a target feature amount corresponding to input data, comprising the steps of:
generating a feature amount extraction expression list including a plurality of feature amount extraction expressions made up of a plurality of operators at random;
inputting actual data supplied as tutor data to each feature amount extraction expression included in said feature amount extraction expression list to compute a plurality of feature amounts corresponding to said actual data;
employing said plurality of feature amounts corresponding to said computed actual data to generate said target feature amount computational expression by machine learning for estimating a target feature amount corresponding to said actual data supplied as tutor data;
computing said evaluation value of each feature amount extraction expression included in said feature amount extraction expression list;
generating said feature amount extraction expression list of the next generation by updating said feature amount extraction expression list of the previous generation using a genetic algorithm based on the evaluation values of said feature amount extraction expressions, regarding a plurality of feature amount extraction expressions included in said feature amount extraction expression list of said previous generation as genes; and
optimizing each of plurality of feature amount extraction expressions included in said feature amount extraction expression list of the final generation.

14. A program for controlling an information processing device for taking input data and an existing feature amount corresponding to said input data as input, and generating a target feature amount computational expression for outputting a target feature amount corresponding to said input data, and causing a computer of the information processing device to execute processing comprising the steps of:
generating a feature amount extraction expression list including a plurality of feature amount extraction expressions made up of a plurality of operators at random;
inputting actual data supplied as tutor data to each feature amount extraction expression included in said feature amount extraction expression list to compute a plurality of feature amounts corresponding to said actual data;
employing said plurality of feature amounts corresponding to said computed actual data, and an existing feature amount corresponding to said actual data supplied as tutor data for the same rank to generate said target feature amount computational expression by machine learning for estimating a target feature amount corresponding to said actual data supplied as tutor data;
computing said evaluation value of each feature amount extraction expression included in said feature amount extraction expression list; and generating said feature amount extraction expression list of the next generation by updating said feature amount extraction expression list of the previous generation using a genetic algorithm based on the evaluation values of said feature amount extraction expressions, regarding a plurality of feature amount extraction expressions included in said feature amount extraction expression list of said previous generation as genes.

15. A program for controlling an information processing device for generating a target feature amount computational expression outputting a target feature amount corresponding to input data, and causing a computer of the information processing device to execute processing comprising the steps of:
　generating a feature amount extraction expression list including a plurality of feature amount extraction expressions made up of a plurality of operators at random;
　inputting actual data supplied as tutor data to each feature amount extraction expression included in said feature amount extraction expression list to compute a plurality of feature amounts corresponding to said actual data, and also measure the average computation time of the respective feature amount extraction expressions;
　employing said plurality of feature amounts corresponding to said computed actual data to generate said target feature amount computational expression by machine learning for estimating a target feature amount corresponding to said actual data supplied as tutor data;
　computing said evaluation value of each feature amount extraction expression included in said feature amount extraction expression list, and also correcting said computed evaluation value based on the average computation time of the respective feature amount extraction expressions; and
　generating said feature amount extraction expression list of the next generation by updating said feature amount extraction expression list of the previous generation using a genetic algorithm based on the evaluation values of said feature amount extraction expressions, regarding a plurality of feature amount extraction expressions included in said feature amount extraction expression list of said previous generation as genes.

16. A program for controlling an information processing device for generating a target feature amount computational expression outputting a target feature amount corresponding to input data, and causing a computer of the information processing device to execute processing comprising the steps of:
　generating a feature amount extraction expression list including a plurality of feature amount extraction expressions made up of a plurality of operators at random;
　inputting actual data supplied as tutor data to each feature amount extraction expression included in said feature amount extraction expression list to compute a plurality of feature amounts corresponding to said actual data;
　employing said plurality of feature amounts corresponding to said computed actual data to generate said target feature amount computational expression by machine learning for estimating a target feature amount corresponding to said actual data supplied as tutor data;
　computing said evaluation value of each feature amount extraction expression included in said feature amount extraction expression list;
　generating said feature amount extraction expression list of the next generation by updating said feature amount extraction expression list of the previous generation using a genetic algorithm based on the evaluation values of said feature amount extraction expressions, regarding a plurality of feature amount extraction expressions included in said feature amount extraction expression list of said previous generation as genes; and
　optimizing each of plurality of feature amount extraction expressions included in said feature amount extraction expression list of the final generation.

17. An information processing device for taking input data and an existing feature amount corresponding to said input data as input, and generating a target feature amount computational expression for outputting a target feature amount corresponding to said input data, comprising:
　a feature amount extraction expression list generating unit configured to generate a feature amount extraction expression list including a plurality of feature amount extraction expressions made up of a plurality of operators by updating said feature amount extraction expression list of the previous generation using a genetic algorithm based on the evaluation values of said feature amount extraction expressions, regarding a plurality of feature amount extraction expressions included in said feature amount extraction expression list of the previous generation as genes;
　a feature amount computing unit configured to input actual data supplied as tutor data to each feature amount extraction expression included in said feature amount extraction expression list to compute a plurality of feature amounts corresponding to said actual data;
　a target feature amount computational expression generating unit configured to employ said plurality of feature amounts corresponding to said computed actual data, and an existing feature amount corresponding to said actual data supplied as tutor data for the same rank to generate said target feature amount computational expression by machine learning for estimating a target feature amount corresponding to said actual data supplied as tutor data; and
　an evaluation value computing unit configured to compute said evaluation value of each feature amount extraction expression included in said feature amount extraction expression list.

18. An information processing device for generating a target feature amount computational expression for outputting a target feature amount corresponding to input data, comprising:
　a feature amount extraction expression list generating unit configured to generate a feature amount extraction expression list including a plurality of feature amount extraction expressions made up of a plurality of operators by updating said feature amount extraction expression list of the previous generation using a genetic algorithm based on the evaluation values of said feature amount extraction expressions, regarding a plurality of feature amount extraction expressions included in-said feature amount extraction expression list of the previous generation as genes;
　a feature amount computing unit configured to input actual data supplied as tutor data to each feature amount extraction expression included in said feature amount extraction expression list to compute a plurality of feature amounts corresponding to said actual data, and also measure average computation time of the respective feature amount extraction expressions;
　a target feature amount computational expression generating unit configured to employ said plurality of feature amounts corresponding to said computed actual data to generate said target feature amount computational expression by machine learning for estimating a target feature amount corresponding to said actual data supplied as tutor data; and an evaluation value computing unit configured to compute said evaluation value of each feature amount extraction expression included in said feature amount extraction expression list, and also correct said computed evaluation value based on the average computation time of the respective feature amount extraction expressions.

19. An information processing device for generating a target feature amount computational expression for outputting a target feature amount corresponding to input data, comprising:

a feature amount extraction expression list generating unit configured to generate a feature amount extraction expression list including a plurality of feature amount extraction expressions made up of a plurality of operators by updating said feature amount extraction expression list of the previous generation using a genetic algorithm based on the evaluation values of said feature amount extraction expressions, regarding a plurality of feature amount extraction expressions included in said feature amount extraction expression list of the previous generation as genes;

a feature amount computing unit configured to input actual data supplied as tutor data to each feature amount extraction expression included in said feature amount extraction expression list to compute a plurality of feature amounts corresponding to said actual data;

a target feature amount computational expression generating unit configured to employ said plurality of feature amounts corresponding to said computed actual data to generate said target feature amount computational expression by machine learning for estimating a target feature amount corresponding to said actual data supplied as tutor data;

an evaluation value computing unit configured to compute said evaluation value of each feature amount extraction expression included in said feature amount extraction expression list; and an optimizing unit configured to optimize each of plurality of feature amount extraction expressions included in said feature amount extraction expression list of the final generation.

* * * * *

UNITED STATES PATENT AND TRADEMARK OFFICE
CERTIFICATE OF CORRECTION

| | |
|---|---|
| PATENT NO. | : 8,131,657 B2 |
| APPLICATION NO. | : 12/243690 |
| DATED | : March 6, 2012 |
| INVENTOR(S) | : Yoshiyuki Kobayashi |

It is certified that error appears in the above-identified patent and that said Letters Patent is hereby corrected as shown below:

On the Title Page, Item (74), in the "*Attorney, Agent, or Firm*", line 2, "Garret" should read --Garrett--.

Signed and Sealed this
Twenty-fourth Day of April, 2012

David J. Kappos
*Director of the United States Patent and Trademark Office*